(12) United States Patent
Mohajeri

(10) Patent No.: US 9,031,539 B2
(45) Date of Patent: *May 12, 2015

(54) ANONYMOUS CUSTOMER REFERENCE CLIENT

(75) Inventor: Shahram Mohajeri, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 242 days.

This patent is subject to a terminal disclaimer.

(21) Appl. No.: 13/482,962

(22) Filed: May 29, 2012

(65) Prior Publication Data

US 2013/0324082 A1 Dec. 5, 2013

(51) Int. Cl.
*H04M 1/66* (2006.01)
*H04M 1/68* (2006.01)
*H04M 3/16* (2006.01)
*H04W 12/06* (2009.01)

(52) U.S. Cl.
CPC ..................... *H04W 12/06* (2013.01)

(58) Field of Classification Search
CPC .... H04W 12/06; H04W 12/04; H04L 63/061; H04L 2209/80; G06F 21/31; G06Q 20/20
USPC ............ 455/411, 41.3, 410, 550.1, 41.2, 418, 455/420, 557, 446, 560, 436, 437, 438, 408
See application file for complete search history.

(56) References Cited

U.S. PATENT DOCUMENTS

| 7,092,367 | B2 | 8/2006 | Kawai et al. |
|---|---|---|---|
| 8,713,669 | B2 | 4/2014 | Guichard et al. |
| 2005/0043041 | A1 | 2/2005 | Ignatius et al. |
| 2006/0053296 | A1* | 3/2006 | Busboom et al. ............. 713/182 |
| 2007/0110050 | A1 | 5/2007 | Johns et al. |
| 2008/0293378 | A1 | 11/2008 | Hinton et al. |
| 2009/0106413 | A1 | 4/2009 | Salo et al. |
| 2009/0174551 | A1 | 7/2009 | Quinn et al. |

(Continued)

OTHER PUBLICATIONS

'Proxy Blind—Staying Anonymous in the Age of Surveillance', www.proxyblind.org, last accessed Jul. 5, 2012.
'Proxy Server Privacy', www.proxyserverprivacy.com, last accessed Jul. 5, 2012.
'Find IP Address', http://www.find-ip-address.org/hide-my-ip.php, last accessed Jul. 5, 2012.
'How do I hide my IP address', http://whatismyipaddress.com/hide-ip, last accessed Jul. 5, 2012.

(Continued)

*Primary Examiner* — Joseph Arevalo
(74) *Attorney, Agent, or Firm* — Amin, Turocy & Watson, LLP

(57) ABSTRACT

A system and methodology that facilitates management and utilization of variable subscriber identifiers (V-SubIds) for protecting subscriber privacy is disclosed herein. In one aspect, an Anonymous Customer Reference (ACR) component receives a V-SubId, which is a short-lived subscriber identifier that is to be inserted in a communication messages transmitted from a user equipment instead of a unique device identifier (UDID) of the user equipment. On expiration of the V-SubId, a new V-SubId is received and utilized in subsequent communication messages transmitted from the user equipment. Further, trusted systems/applications can exchange the V-SubId for a subscriber identifier (SubId) associated with the user equipment. Furthermore, untrusted systems/applications can exchange, based on user authorization, the V-SubId for an application-specific ACR that remains static and/or valid for a predefined time period. Moreover, the application-specific ACR is utilized as a device identifier for the user equipment in subsequent communication messages for the predefined time period.

20 Claims, 13 Drawing Sheets

(56) References Cited

U.S. PATENT DOCUMENTS

| | | |
|---|---|---|
| 2009/0217351 A1 | 8/2009 | Burch et al. |
| 2009/0227290 A1 | 9/2009 | Chien |
| 2010/0091763 A1 | 4/2010 | Thompson |
| 2010/0279718 A1* | 11/2010 | Borve .......................... 455/466 |
| 2012/0110469 A1 | 5/2012 | Magarshak |
| 2012/0190363 A1 | 7/2012 | Maeda et al. |
| 2013/0080774 A1 | 3/2013 | Combet et al. |
| 2013/0291071 A1* | 10/2013 | Blom et al. ........................ 726/4 |
| 2013/0304604 A1* | 11/2013 | Hoffman et al. ............ 705/26.5 |
| 2014/0101743 A1* | 4/2014 | Busboom et al. ................. 726/7 |

OTHER PUBLICATIONS

Office Action dated Aug. 6, 2013 for U.S. Appl. No. 13/445,714, 24 pages.

Non-Final Office Action dated Jul. 23, 2014 for U.S. Appl. No. 14/219,833, 38 pages.

Non-Final Office Action dated Dec. 2, 2014 for U.S. Appl. No. 13/594,161, 44 pages.

* cited by examiner

ANONYMOUS CUSTOMER REFERENCE CLIENT

CROSS REFERENCE TO RELATED APPLICATIONS

This application is related to U.S. patent application Ser. No. 13/445,714, filed on Apr. 12, 2012, entitled "ANONYMOUS CUSTOMER REFERENCE SERVICES ENABLER," (now U.S. Pat. No. 8,718,607, issued on 6 May 2014) and co-pending U.S. patent application Ser. No. 13/594,161, filed on 24 Aug. 2012 entitled "ALGORITHM-BASED ANONYMOUS CUSTOMER REFERENCES." The entireties of each of the foregoing applications are incorporated herein by reference.

TECHNICAL FIELD

The subject disclosure relates to wireless communications and, more particularly, to an anonymous customer reference client.

BACKGROUND

Communication devices are seeing an explosive growth in application (app) development and utilization. The applications, or 'apps', can be pre-installed on the communication device by a manufacturer and/or downloaded by subscribers, for example, via an over-the-air (OTA) communication from a software distribution platform. By way of brief background, app developers can create custom applications by utilizing a unique identifier (ID) specific to a communication device. With communication devices and apps proliferating, protecting user privacy with respect to profiling and/or tracking a subscriber's behavior across apps and/or websites is of continued importance.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can mitigate user activity tracking and/or profiling by unauthorized entities (e.g., websites, systems, etc.), by utilization of variable subscriber identifiers (V-SubIds) as a device identifier. In one aspect, the disclosed subject matter relates to a system comprising at least one memory that stores computer-executable instructions and at least one processor, communicatively coupled to the at least one memory, that facilitates execution of the computer-executable instructions. Moreover, the computer-executable instructions on execution issue a request for an authentication between a user equipment and a first communication network to be performed, the authentication employing a static identifier associated with the user equipment. Additionally, the computer-executable instructions, on execution receive at the user equipment via the first communication network a variable subscriber identifier corresponding to the static identifier, in response to the authentication being successful, provide the variable subscriber identifier to an application, the application being executable at least in part by a processor on the user equipment, and utilize the variable subscriber identifier as an identifier of the user equipment during a communication that involves the application and that takes place via a second communication network.

Another aspect of the disclosed subject matter relates to a method that includes requesting, by a system comprising at least one processor, a network gateway within a telecommunications network for a variable subscriber identifier that is to be utilized as a device identifier for a user equipment and receiving, by the system, the variable subscriber identifier that is generated in response to authenticating the user equipment with the telecommunications network by employing a static identifier associated with the user equipment. Further, the method includes utilizing, by the system, the variable subscriber identifier as the device identifier of the user equipment during communication. Yet another aspect of the disclosed subject matter relates to a computer-readable storage medium comprising computer-executable instructions that, in response to execution, cause a system, including at least one processor, to perform operations including requesting authentication of a user equipment in connection with determining whether to allow the user equipment to connect with a first communication network including authenticating as a function of a static identifier associated with the user equipment. In addition, the operations include receiving, from the first communication network, a variable subscriber identifier that is generated in response to the authentication being successful and utilizing the variable subscriber identifier as a device identifier of the user equipment during communication via a second communication network.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
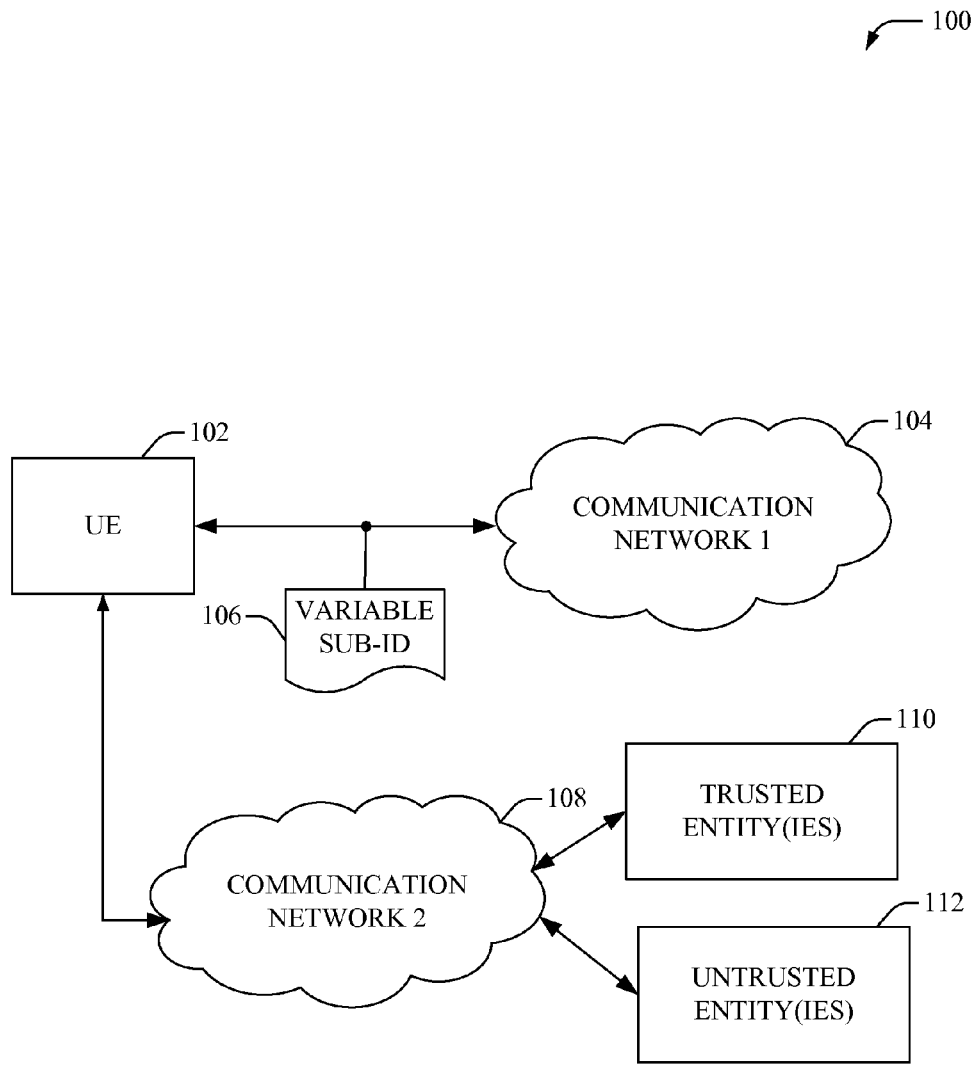
FIG. 1 illustrates an example system that facilitates utilization of a variable subscriber identifier (V-SubId) instead of a unique device identifier to protect user privacy.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "service," "platform," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the words "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile device," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Furthermore, the terms "user," "subscriber," "customer," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

Application (app) developers and other potentially non-trusted entities can monitor and/or track communication device users through a unique identifier (ID) (e.g., subscriber identifier (SubId) and/or unique device ID (UDID)) related to a subscriber of the communication device, creating privacy problems for the users. The systems and methods disclosed herein facilitate generation and utilization of a variable subscriber ID (V-SubId) to prevent or impede profiling and/or subscriber-behavior tracking by unauthorized applications/entities. In one aspect, the V-SubId masks the subscriber's identity (e.g., UDID and/or SubId) from selected unauthorized websites and/or applications that are accessed by the subscribers. Moreover, the V-SubId can be modified periodically such that subscriber privacy can be protected.

Aspects or features of the disclosed subject matter can be exploited in substantially any wired or wireless communication technology; e.g., Universal Mobile Telecommunications System (UMTS), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology. Additionally, substantially all aspects of the disclosed subject matter can be exploited in legacy (e.g., wireline) telecommunication technologies.

Referring initially to FIG. 1, there illustrated is an example system 100 that facilitates utilization of a V-SubId to protect user privacy, according to one or more aspects of the disclosed subject matter. System 100 can assign a V-SubId to a subscriber's account/user equipment (UE) 102 in response to a successful authentication, such as a subscriber identity module (SIM) authentication and/or SIM-based authentication, between the UE 102 and a communication network 104. System 100 can be utilized to mask and/or replace a unique ID associated with the UE 102 during communication between the UE 102 and one or more systems/services.

By way of example, UE 102 can include most any electronic communication device such as, but not limited to, most any consumer electronic device, for example, a tablet computer, a digital media player, a digital photo frame, a digital camera, a cellular phone, a personal computer, a personal digital assistant (PDA), a smart phone, a laptop, a gaming system, etc. Further, UE 102 can also include, for example, LTE-based devices, such as, but not limited to, most any home or commercial appliance that includes an LTE radio. It is noted that UE 102 can be mobile, have limited mobility and/or be stationary. Typically, the UE 102 can be associated with a unique identifier (ID) that facilitates identification of the subscriber and/or the UE 102. For example, the subscriber of the UE 102 is assigned a unique and constant subscriber identifier (SubId) (e.g., by a service provider), for example, that is associated with the subscriber identity module (SIM) of the UE 102 and/or a subscriber account associated with the UE 102. In one example, the SubId is independent of a Mobile Station International Subscriber Directory Number (MSISDN) and/or SIM of the UE 102, and does not change if the MSISDN is modified and/or SIM is replaced. Additionally, the UE 102 can be assigned a unique device ID (UDID) (e.g., by a manufacturer and/or service provider), for example, a serial number that is specific to UE 102. In one aspect, applications (apps) residing on UE 102 utilize the UDID to facilitate customization and/or remember user preferences. Moreover, utilization of the UDID enables consistent data services and/or a seamless service experience across data sessions for the UE 102.

In one embodiment, system 100 can include a communication network 1 (104), for example, a cellular network, that can serve the UE 102. As an example, the UE 102 can be coupled to the communication network 1 (104) via one or more radio access network(s) and/or network elements (not shown). In an aspect, the UE 102, for example, on power-on and/or on entering a coverage area of the communication network 1 (104), can perform a SIM authentication with the communication network 1 (104) (e.g., via handshaking with a home location register (HLR)) to authorize the UE 102 to connect to and communicate via the communication network 1 (104). By way of example, on authentication, a network support node, for example, Gateway GPRS Support Node (GGSN), can assign an Internet protocol (IP) address to the UE 102, identify a device number, such as, but not limited to, a Mobile Station International Subscriber Directory Number (MSISDN) associated with the UE 102 (e.g., from the HLR), and propagate the IP address and corresponding MSISDN to downstream network elements, (e.g., network gateways). In one aspect, on authentication and connection with the communication network 1 (104), the UE 102 can request (e.g., periodically, on demand, based on an event, etc.) a variable SubId (V-SubId) 106 that can be utilized in place of a UDID of the device.

When the request from UE 102 is received, a network element (e.g., network gateway) can detect an IP address associated with the UE 102 from the request, and accordingly determine the corresponding MSISDN of the UE 102 associated with the IP address. Moreover, a SubId associated with the MSISDN can be identified and a V-SubId 106 can be generated based on, or independent of, the SubId. Typically, the SubId can be a unique and unchangeable identifier associated with a subscriber of UE 102. In contrast, the V-SubId 106 can change with time (e.g., periodically, on demand, based on an event/schedule, etc.) and/or across data sessions such that subscriber activity monitoring and/or tracking is prevented or impeded. As an example, the V-SubId 106 can be randomly generated, unique, opaque, and/or can be repeated and/or reused (for different UEs). The V-SubId 106 can be transmitted to the UE 102 by the communication network 1 (104) and can be utilized by one or more applications/browsers on the UE 102, during communication over a communication network 2 (108) (and/or communication over the communication network 1 (104)). As an example, the communication network 2 (108) can include a WiFi network. In an aspect, the UE 102 can utilize the V-SubId 106 for communication with trusted entities 110 (e.g., systems and/or servers that are authorized to track/monitor the subscriber/UE 102 activity) and/or untrusted entities 112 (e.g., systems and/or servers that are not authorized to track/monitor the subscriber/UE 102 activity). Accordingly, the V-SubId 106, due to its changing nature, can prevent or impede traceability of the subscriber and/or UE 102, while allowing a network service provider to uniquely identify the subscriber associated with the V-SubId, if the need arises (e.g., for law enforcement).

In addition, if the UE 102 communicates via the communication network 1 (104), a SubId enrichment policy can be utilized, wherein on receiving a request (e.g., communication message and/or data packet) from UE 102, a network gateway (not shown) within the communication network 1 (104) can insert either the SubId or the V-SubId 106 associated with the UE 102 in a header of the request, based on the destination of the request. For example, the network gateway can determine whether the destination of the request is a trusted entity(ies) 110 or an untrusted entity(ies) 112, for example, based on a destination uniform resource locator (URL) within the request. In one aspect, if the network gateway determines that the destination of the request is a trusted entity 110, the header of the request can be updated with the SubId associated with UE 102, and the updated request can be forwarded to the trusted entity 110. Alternatively, if the network gateway determines that the destination of the request is an untrusted entity 112, the header of the request is updated with the V-SubId 106, and forwarded to the untrusted entity 112. In an aspect, the request directed to the trusted entity(ies) 110 and/or untrusted entity(ies) 112 via the communication network 1 (104) as disclosed herein can include most any communication message and/or data packet(s) delivered from the UE 102 to a network server (e.g., a web server, an application server, an email server, etc.). In one example, the request can include (but is not limited to) a request for information/data from the network server. In another example, the request can also include (but is not limited to) an instruction and/or command for requesting the network server to perform a specific action (e.g., load a new web page, refresh a web page, delete an email, etc.). In yet another example, the request can include a HTTP request (e.g., a GET request, a PUT request, a DELETE request, etc.). However, it is noted that the subject disclosure is not limited to HTTP requests, and that the UE 102 can transmit requests utilizing most any communication protocol (e.g., Secure-HTTP (S-HTTP), HTTP Secure (HTTPS), SPDY® protocol, Waka protocol, a proprietary protocol, etc.). Moreover, if the UE 102 utilizes a secure protocol such as (but not limited to) S-HTTP and/or HTTPS, a network server (not shown) can perform a HTTP Redirect (302) onto an endpoint within the server served by HTTP such that the network gateway can enrich the request with V-SubId/SubId.

Although communication network 1 (104) is described herein to include a mobility and/or cellular network(s), it is noted that the communication network 1 (104) can include most any communication network (e.g., wired or wireless) that facilitates authentication with UE 102 based on a unique ID/credential associated with the UE 102 and/or subscriber of the UE 102, prior to the UE 102 connecting to and/or accessing the communication network 1 (104). In addition, the communication network 2 (108) is not limited to a WiFi network and can include most any communication network (e.g., wired or wireless). As an example, UE 102 can connect to and/or communicate via communication network 1 (104) and communication network 2 (108) simultaneously and/or at different times.

Figure 2:
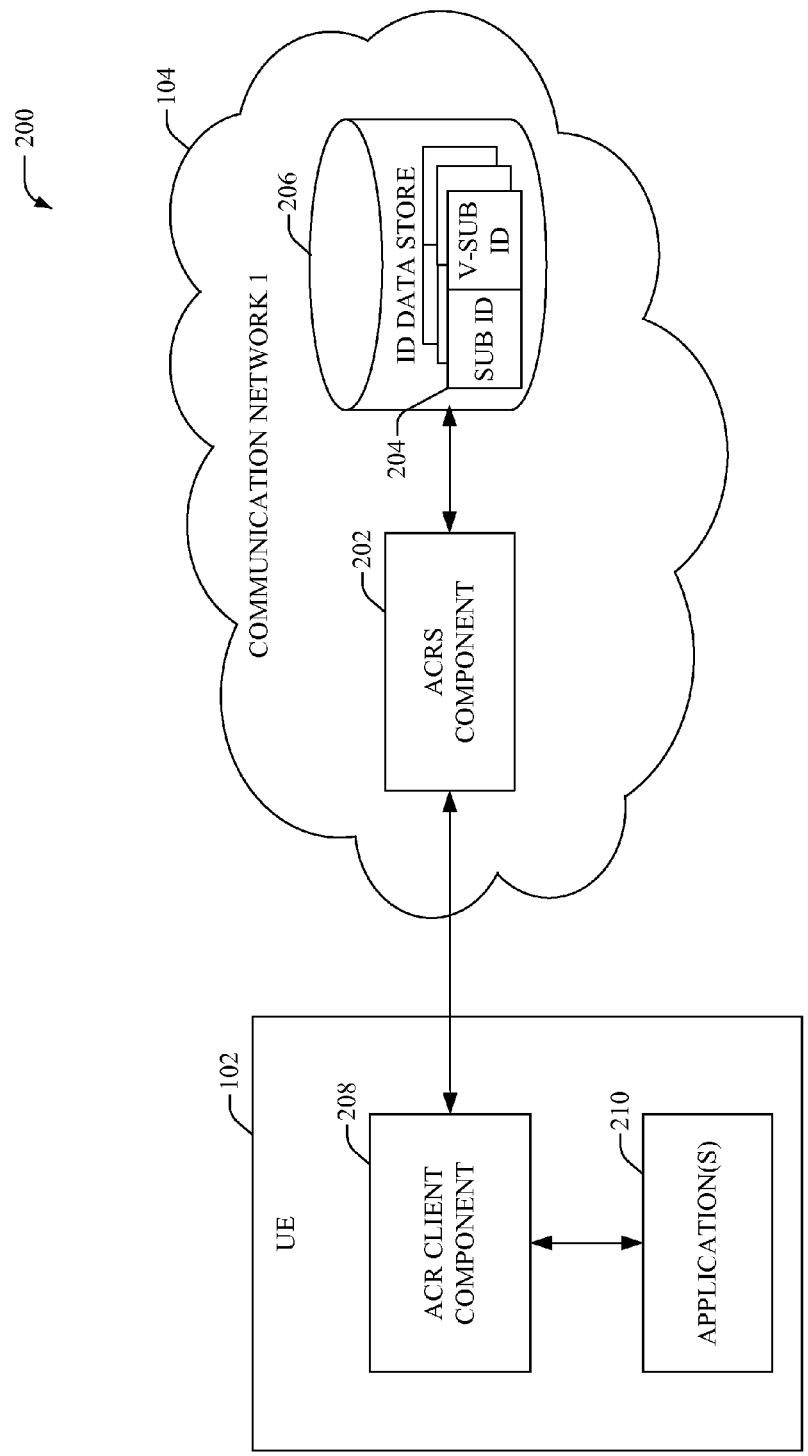
FIG. 2 illustrates an example system that facilitates generation and transmission of V-SubIds over a mobility network.

Referring now to FIG. 2, there illustrated is an example system 200 that facilitates generation and transmission of V-SubIds over a communication network, in accordance with an aspect of the subject disclosure. To mitigate the risk of undesired subscriber-behavior tracking by unauthorized systems, system 200 facilitates utilization of a V-SubId in place of a unique device ID associated with UE 102. In an aspect, the V-SubId is generated subsequent to an authentication (e.g., SIM-based authentication) between the UE 102 and a communication network 1(104) (e.g., a cellular network). For example, the authentication can be performed when the UE 102 is powered on or when the UE 102 enters a coverage area associated with communication network 1(104). It is noted that the UE 102 and communication network 1(104) can include functionality as more fully described herein, for example, as described above with regard to system 100.

In one embodiment, the communication network 1(104) can include an anonymous customer reference services (ACRS) component 202 that facilitates generation and management of V-SubIds associated with UE 102. Moreover, the V-SubId can be a SIM-based Identifier, for example, an identifier that is generated and/or assigned to the SubId if a SIM, or SIM-based, authentication performed as part of the UE 102's connecting to the communication network 1(104) is successful. As an example, the V-SubId can include most any random, opaque, and/or unique (for a specific time and/or session) number or code that can change periodically or based on an event/criterion, such as (but not limited to) expiration of a timer, termination of a data session, etc. In an aspect, the ACRS component 202 can generate the V-SubId by employing most any random number generator that can create the V-SubId based on, or independent of, the SubId, MSISDN, UDID, etc. associated with UE 102. For example, the ACRS component 202 can utilize a 32-digit long random number or an MD5 hash of a random number.

Further, the ACRS component 202 can store (e.g., temporarily or permanently) the V-SubId in one or more tables 204 retained within ID data store 206. As an example, a one-to-one mapping can exist between the V-SubId and the SubId associated with the UE 102 such that a SubId query based on the V-SubId can be performed (e.g., by service provider partner systems, law enforcement systems, etc.) and the SubId corresponding to the queried V-SubId can be retrieved (e.g., to identify a subscriber or UE). In one aspect, the ACRS component 202 can identify a triggering event (e.g., when a subscriber's data session has ended and/or a timer associated with the V-SubId has expired), and can remove and/or modify the V-SubId from the one or more tables 204. As an example, transaction logs associated with creation, removal, and/or modification of records (e.g., including the V-SubId) within the one or more tables 204 can be saved (e.g., by the ACRS component 202), such that, a subscriber's transaction can be identified at a later time (e.g., for law-enforcement purposes).

In one aspect, UE 102 can include an anonymous customer reference (ACR) client component 208 that can request a V-SubId from the ACRS component 202, retain the V-SubId received from the ACRS component 202, and provide the V-SubId to an application(s) 210. For example, the ACR client component 208 can request for the V-SubId periodically (e.g., every 24 hours), based on an event (e.g., expiration of a timer) and/or on demand (e.g., when requested by application(s) 210). Moreover, on receiving a request for the V-SubId from the ACR client component 208, the ACRS component 202 can perform a table lookup to determine if a previously generated valid and/or non-expired V-SubId exists for the subscriber of UE 102 and is stored in the one or more tables 204. If a valid and/or non-expired V-SubId is assigned to the subscriber's SubId, the existing V-SubId can be returned to the ACR client component 208 by the ACRS component 202. In contrast, if valid and/or non-expired V-SubId does not exist for the subscriber, the ACRS component 202 can generate a new V-SubId and return the new V-SubId to the ACR client component 208. Additionally or optionally, the V-SubId can be stored at the UE 102 (e.g., by the ACR client component 208) for a specific time period (e.g., 24 hours) to avoid and/or minimize communication between the ACR client component 208 and the ACRS component 202. It is noted that the communication between the ACR client component 208 and the ACRS component 202 is secured based on most any authentication and/or authorization technique(s).

Application(s) 210 can include most any applications that enable the UE 102 to perform a specific task. Typically, application(s) 210 can be pre-installed (e.g., during manufacture or provisioning), downloaded/updated by the UE 102 from a software distribution platform, received via an over-the-air (OTA) update, and the like. As an example, application(s) 210 can also include (but are not limited to) web applications and/or web browsers. In one aspect, during communication (e.g., via communication network 2(108)) application(s) 210 can include the V-SubId in the communication data. For example, application(s) 210 can extract and/or receive the V-SubId, through an application programming interface (API) provided by the ACR client component 208 and can insert the V-SubId in a header (e.g., Hypertext Transfer Protocol (HTTP) header) and/or body of a communication message. In another example, the V-SubId can be appended to the header and/or body of the communication message.

Accordingly, system 200 facilitates utilization and delivery V-SubIds (and not a SubId/UDID) to entity(ies) (e.g., trusted and/or untrusted entities) during a communication between the UE 102 and the entity(ies) via the communication network 2 (108). Further, it is noted that the ID data store 206 can include volatile memory(s) or nonvolatile memory(s), or can include both volatile and nonvolatile memory(s). Examples of suitable types of volatile and non-volatile memory are described below with reference to FIG. 13. The memory (e.g., data stores, databases) of the subject systems and methods is intended to include, without being limited to, these and any other suitable types of memory.

Figure 3:
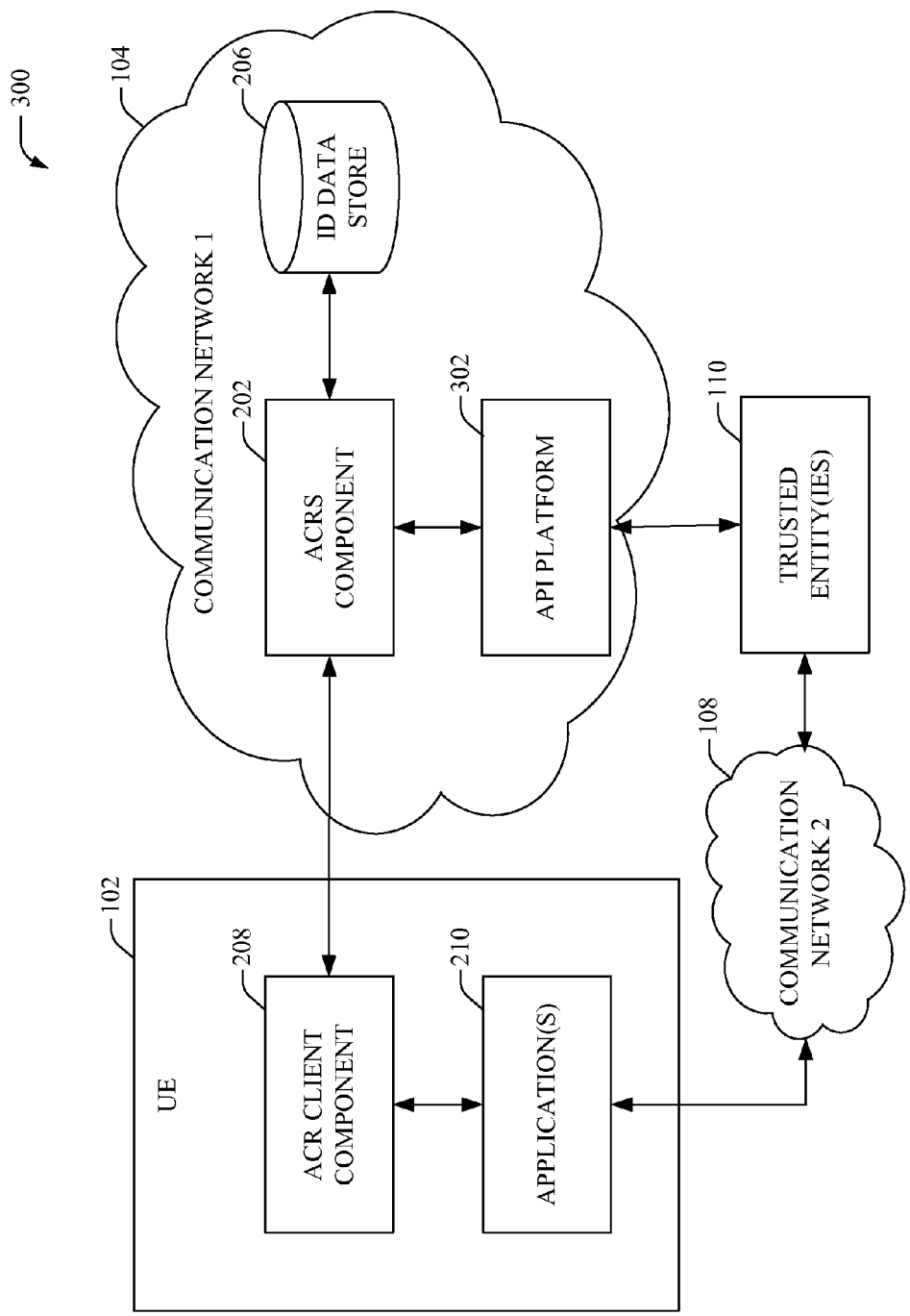
FIG. 3 illustrates an example system that facilitates a reverse lookup for a subscriber identifier (SubId) by a trusted entity.

Referring now to FIG. 3, there illustrated is an example system 300 that facilitates a reverse lookup for a SubId by a trusted entity, in one aspect of the subject disclosure. Typically, system 300 can be utilized for providing V-SubIds associated with a subscriber (e.g., in place of a static UDID), to one or more websites, systems, platforms, etc. to facilitate communication with UE 102. It is noted that the UE 102, communication network 1(104), communication network 2(108), trusted entity(ies) 110, ACRS component 202, and ID data store 206, ACR client component 208, and application(s) 210 can include functionality as more fully described herein, for example, as described above with regard to systems 100 and 200. As an example, trusted entity(ies) 110 depicted in FIG. 3 can include (but are not limited to) a trusted website, system, network, platform, server, etc., which can be authorized (e.g., by the user and/or service provider) to receive and/or utilize a unique and static identifier (e.g., SubId) associated with the subscriber of UE 102, for example, for implementing value added services. For example, the trusted entity(ies) 110 can utilize the unique and/or static identifier (e.g., SubId) to enable consistent data services and/or provide a seamless service experience across data sessions for the UE 102 (e.g., one-click payment taking advantage of implicit authentication already done as part of the UE 102's logging on and/or connecting to the communication network 1(104)).

In one aspect, the UE 102 can access the trusted entity(ies) 110 via one or more networked elements/nodes/links in communication network 2(108). Additionally or alternatively, a trusted entity(ies) 110 (e.g., a trusted website) can be accessed by the applications 210 from a link on an untrusted entity (not shown). As described herein, the applications 210 on UE 102 provide a V-SubId to the trusted entity(ies) 110 during communication between the UE 102 and the trusted entity(ies) 110. As an example, the V-SubId is inserted within a header (e.g., HTTP header) and/or body of a message/request transmitted from the UE 102 to the trusted entity(ies) 110. In one aspect, based on an analysis of the request/message, the trusted entity(ies) 110 can detect that the received ID (e.g., within a header/body of the message/request) is a V-SubId. For example, V-SubIds can have a specific configuration and/or syntax, such as, but not limited to, a predefined code within the first/last N digits/characters (wherein N can be most any positive integer), which can be identified by the trusted entity(ies) 110 to verify that the received ID is a V-SubId.

In one embodiment, the trusted entity(ies) 110 can exchange the V-SubId for a SubId associated with the subscriber via an application programming interface (API) platform 302. As an example, the API platform 302 can receive a query that includes the V-SubId from the trusted entity(ies) 110. In one aspect, the API platform 302 can verify that the trusted entity(ies) 110 is authorized to receive the SubId, for example, based on a URL-based authorization and/or a certificate-based authorization. In response to successful verification, the API platform 302 can query the ACRS component 202 for the SubId. In one aspect, the ACRS component 202 can perform a reverse lookup to retrieve the SubId corresponding to the V-SubId, from the ID data store 206. As an example, the API platform 302 can provide an appropriate interface (e.g., Representational state transfer (RESTful) interface, Simple Object Access Protocol (SOAP) interface, etc.) to facilitate secure communication between the trusted entity(ies) 110 and the ACRS component 202. Additionally or alternatively, to minimize communication between the trusted entity(ies) 110 and the ACRS component 202, the trusted entity(ies) 110 can determine and/or generate the SubId based on a decoding technique/algorithm applied to the V-SubId in response to the V-SubId being generated based on applying a coding technique/algorithm to the SubId. For example, the V-SubId can be generated based on a hash/signature of the SubId and the trusted entity(ies) 302 can identify the SubId by applying an inverse hash/signature algorithm to the V-SubId.

As an example, communication network 1(104) can include (but is not limited to) a cellular network and communication network 2(108) can include (but is not limited to) a WiFi network. However, communication network 1(104) and/or communication network 2(108) are not limited to wireless networks and can include most any wired communication network. Further, although it is depicted in FIG. 3 as residing outside communication network 1(104) and communication network 2(108), the trusted entity(ies) 110 can be included within communication network 1(104) or communication network 2(108). Additionally or alternatively, in one example aspect, trusted entity(ies) 110 can include (but are not limited to) at least a portion of application(s) 210 on the UE 102. In this example aspect, trusted entity(ies) 110 can retrieve the SubId corresponding to the V-SubId, via secure communication with the API platform 302 over communication network 1(104) and/or communication network 2 (108). As an example, the API platform 302 can authenticate (e.g., based on URL data, security certificates, etc.) the trusted entity(ies) 110 prior to providing the SubId to the trusted entity(ies) 110, to prevent access by an untrusted entity. Furthermore, it is noted that the ID data store 206 can also reside (e.g., completely or partially) within the ACRS component 202 and/or be locally or remotely coupled to the ACRS component 202.

Figure 4:
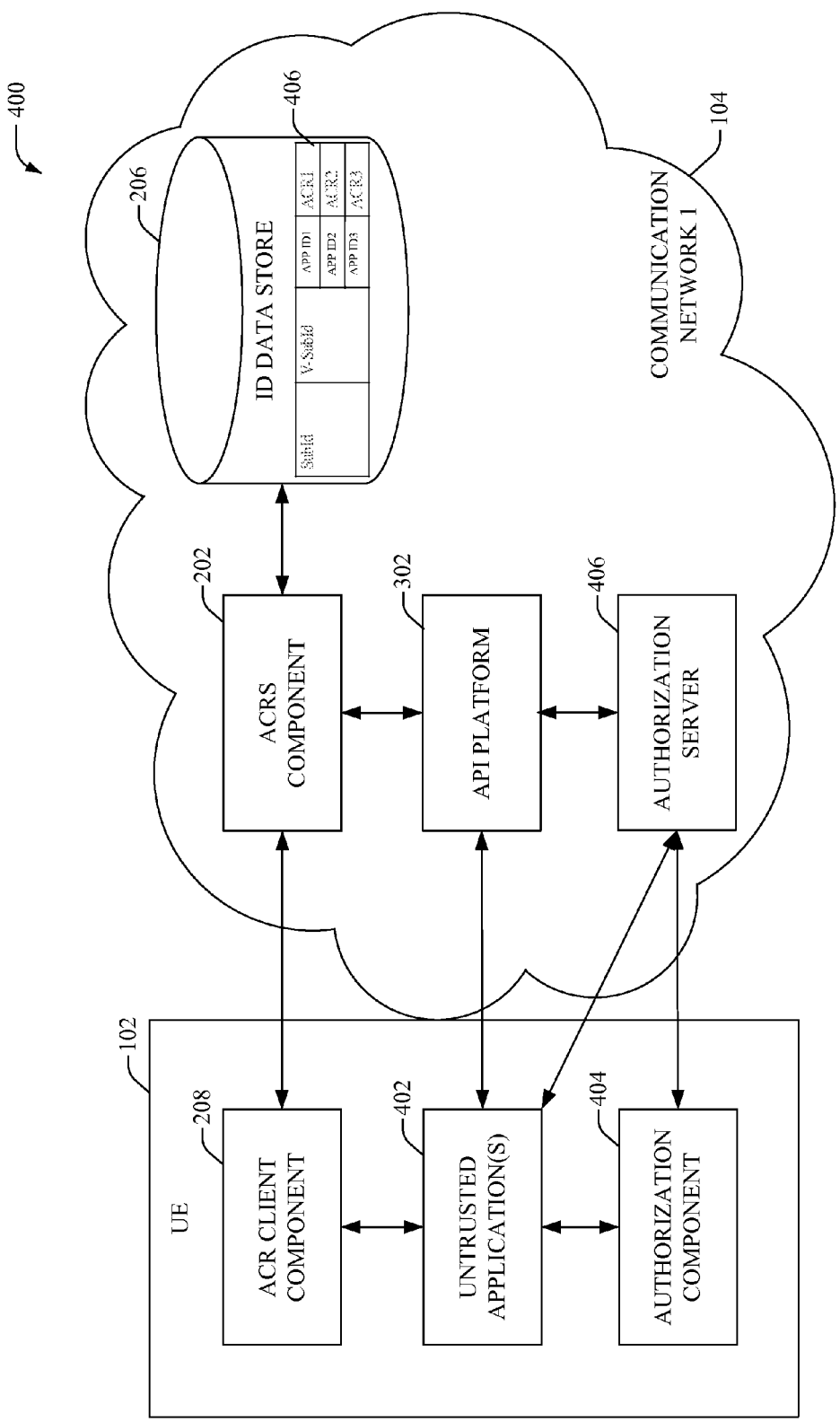
FIG. 4 illustrates an example system that facilitates generation and management of an anonymous customer reference (ACR).

FIG. 4 illustrates an example system 400 that facilitates generation and management of an anonymous customer reference (ACR), in one aspect of the subject innovation. Typically, system 400 can facilitate exchange of a V-SubId for an application-specific ACR based on a subscriber's authorization. Moreover, the system 400 enables a user to specify and/or authorize an application to receive, based on a SIM (or SIM-based) authentication, an ID (ACR) that is static (non-changing) for a specific time period. The UE 102, communication network 1(104), ACRS component 202, ID data store 206, ACR client component 208, and API platform 302 can include functionality as more fully described herein, for example, as described above with regard to systems 100-300.

In one aspect, the API platform 302 provides an interface for untrusted application(s) 402 to make a request for an ACR based on user authorization. As an example, untrusted application(s) 402 can be substantially similar to application(s) 210 and can include functionality as more fully described herein, for example, as described above with regard to application(s) 210. Moreover, untrusted application(s) 402 can include most any applications (e.g., third-party applications) that are not authorized to access a device ID and/or SubId associated with the UE 102. In an aspect, the ACRS component 202 can generate ACRs and manage ACR lifecycles, in response to receiving a request for an ACR from the untrusted application(s) 402. As an example, the ACR can include most any random number or code that can be based on, or independent of, a SubId/UDID/MSISDN associated with UE 102. Typically, the ACR can be specific to a particular untrusted application(s) 402 and/or can be static for a specified time period. In one aspect, the untrusted application(s) 402 can obtain user authorization to request the ACR via authorization component 404. As an example, the authorization component 404 can request and receive user approval via an input/output interface (not shown) of UE 102. In one aspect, the authorization component can facilitate communication between the UE 102 and an authorization server 406 within the communication network 104. For example, the authorization component 404 can provide data indicative of the user approval to the authorization server 406, which in turn can communicate with the untrusted application(s) 402 to deliver data such as (but not limited to) an authorization token to the untrusted application(s) 402. On obtaining the authorization token, the untrusted application(s) 402 can communicate with the API platform 302 (e.g., via one or more network servers) to facilitate retrieval of the ACR. Moreover, the API platform 302 can verify the authorization token by communication with the authorization server 406 and query the ACRS component 202 for the ACR in response to the authorization token being verified. The ACRS component 202 can generate the ACR for the untrusted application 402 and store the ACR in a table 406 within the ID data store 206. As an example, the communication with the authorization server 406 to facilitate authorization can employ (but is not limited to) an OAuth-flow that is used to ensure subscriber's authorization for the ACR request by the untrusted application(s) 402. OAuth is a security protocol that is developed by the Internet Engineering Task Force (IETF) OAuth Working Group and is defined by Hammer et al., "The OAuth 2.0 Authorization Protocol draft-ietf-oauth-v2-25," Mar. 8, 2012, which is incorporated by reference herein. It is noted that the subject disclosure is not limited to the OAuth protocol, and most any communication protocol can be utilized for authorization.

While the ACR is active, the ACRS component 202 can provide the ACR to the API platform 302 and/or the ACR client component 208, for servicing subsequent requests for ACR from the untrusted application(s) 402. As an example, the expiration time associated with the ACR can be specified by the user during authorization (e.g., via authorization component 404) and/or can be set to a code (e.g., "999") that indicates that the ACR will not expire unless explicitly requested by the subscriber and/or the untrusted entity(ies) 108. Further, the untrusted application(s) 402 and/or subscriber (via UE 102) can request an ACR cancellation through API platform 302. As an example, OAuth-flow (e.g., via authorization component 404) can be employed to provide the subscriber's authorization for the ACR cancellation, if requested by the untrusted application(s) 402 (e.g., the same authorization token that was utilized to create the ACR can be reused to cancel the ACR). Moreover, on receiving the ACR cancellation request (e.g., authorized by the subscriber), the ACRS component 202 can remove the ACR from the table 406 and notify the untrusted application(s) 402 and/or the ACR client component 208 of the cancelled ACR.

In one aspect, the ACR can include a predefined code, for example, within the first/last N digits/characters (wherein N can be most any positive integer), which can be identified by a trusted entity (e.g., trusted entity(ies) 110), accessed via untrusted application(s) 402, to verify that the received ID is an ACR. Moreover, as with the V-SubId, the trusted entity can exchange the ACR for a SubId associated with the subscriber via the API platform 302. In one example, the API platform 302 can receive the ACR from the trusted entity, determine that the trusted entity is authorized to receive the SubId (e.g., based on a URL associated with the trusted entity), and on successful verification, query the ACRS component 202 for the SubId. In one aspect, the ACRS component 202 can perform a reverse lookup to retrieve a SubId corresponding to the ACR, from the ID data store 206.

Figure 5:
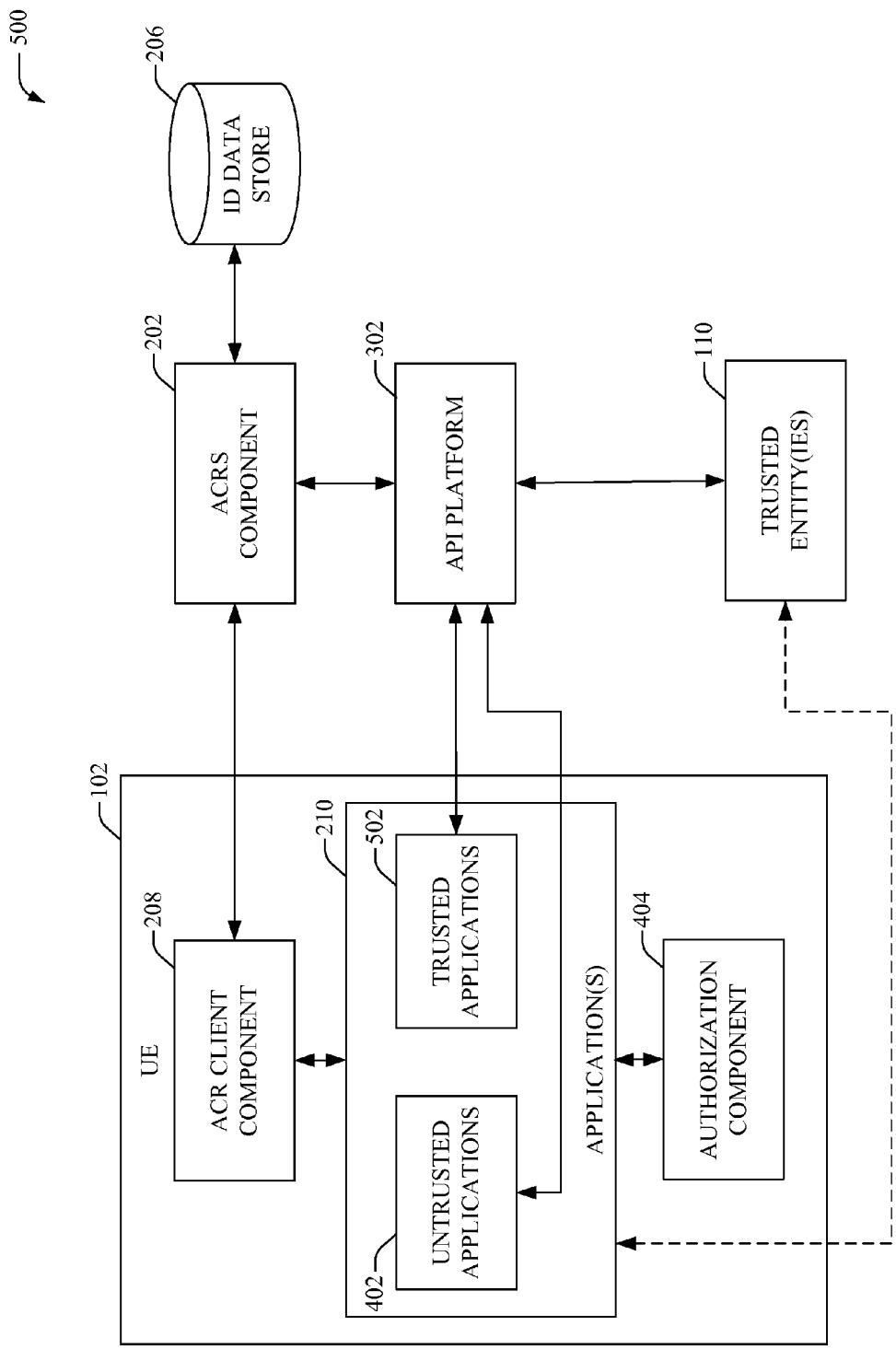
FIG. 5 illustrates an example system that utilizes subscriber identity module (SIM)-based authentication to provide application-specific ACRs.

Referring now to FIG. 5, there illustrated is an example system 500 that utilizes SIM-based authentication to provide application-specific ACRs, in one aspect of the subject innovation. Typically, the UE 102, trusted entity(ies) 110, ACRS component 202, ID data store 206, ACR client component 208, application(s) 210, API platform 302, untrusted applications 402, and authorization component 404 can include functionality as more fully described herein, for example, as described above with regard to systems 100-400.

In this embodiment, initially the ACR client component 208 provides a V-SubId (e.g., in place of a UDID/SubId) to both trusted applications 502 and untrusted applications 402. As described herein with respect to system 400, the untrusted applications 402 can exchange the V-SubId for an ACR via API platform 302, based on user approval (e.g., via communication with the authorization server 406). In one aspect, the trusted application(s) 502 of system 500 can also request an ACR via the API platform 302. Moreover, the API platform 302 can receive user authorization, prior to the ACRS component 202 generating the ACR for the trusted application(s) 502 (and/or for the untrusted applications 402). On receiving user approval, the ACRS component 202 can create and/or store respective ACRs for the trusted application(s) 502 and untrusted applications 402 in ID data store 206. In one example, the ACRs can be utilized by the ACR client component 208 for subsequent requests from the trusted application(s) 502 and/or untrusted applications 402, for example, until deleted and/or cancelled by the subscriber and/or the application (e.g., the trusted application(s) 502 and/or untrusted applications 402).

Further, a portion of application(s) 210 that are not authorized by the user (e.g., via authorization component 404) to receive the ACR can continue to utilize the V-SubId as a device/subscriber identifier (e.g., instead of a UDID). As an example, this portion of application(s) 210 can provide the V-SubId to a trusted entity(ies) 110 (e.g., trusted websites, servers, systems, etc.) during communication with the trusted entity(ies) 110 via one or more networked elements/nodes/links of most any communication network (e.g., communication network 2(108)). In one aspect, based on an analysis of the communication, the trusted entity(ies) 110 can detect that the received ID (e.g., within a header/body of the message/request) is a V-SubId and can exchange the V-SubId for an ACR (e.g., an identifier that does not change for a predefined time period) via the API platform 302.

Figure 6:
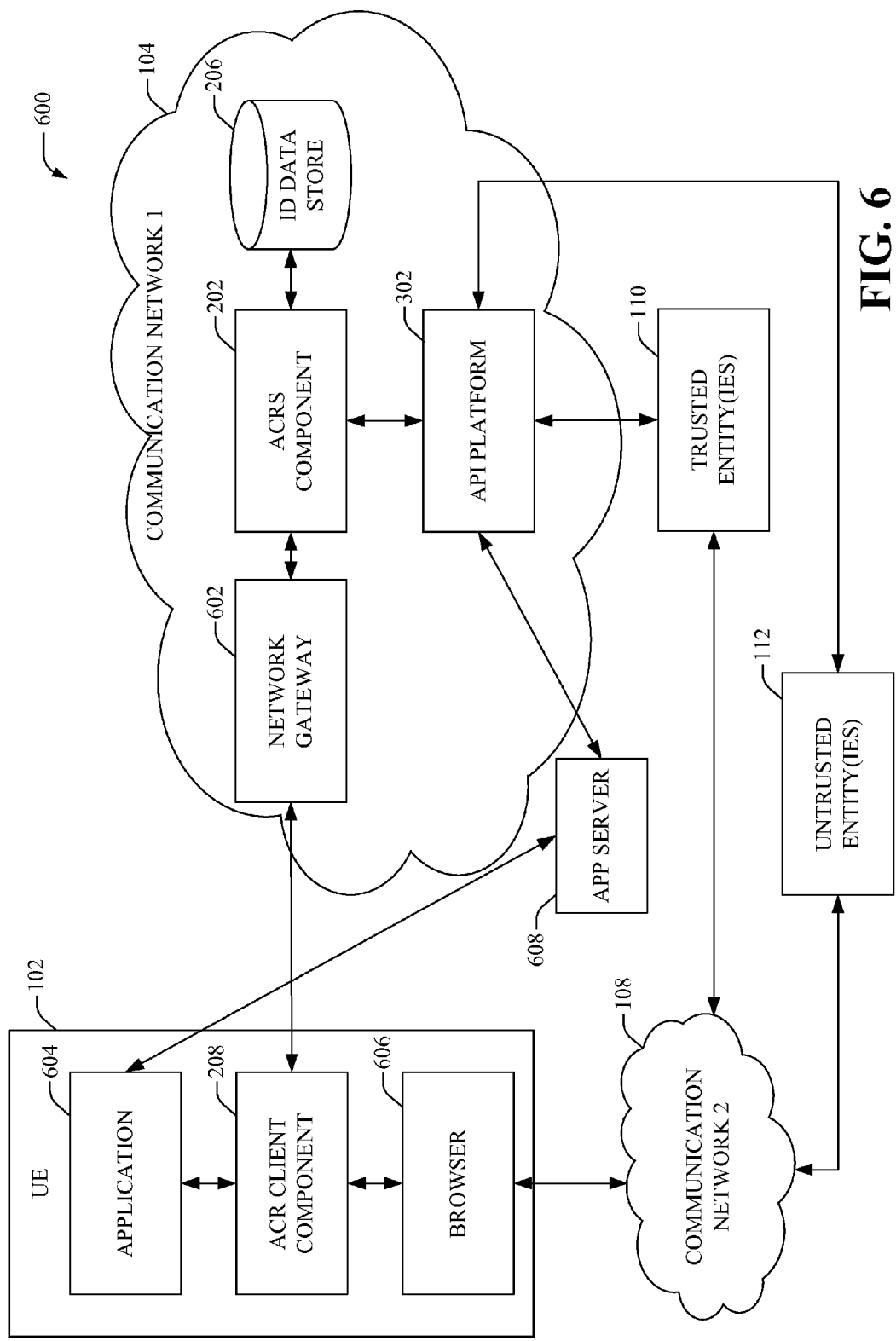
FIG. 6 illustrates an example high-level logical architecture for utilization of V-SubIds in devices to protect user privacy.

FIG. 6 illustrates an example high-level logical architecture 600 for utilization of V-SubIds in devices, in an aspect of the disclosed subject matter. Typically, the UE 102, communication network 1(104), communication network 2(108), trusted entity(ies) 110, untrusted entity(ies) 112, ACRS component 202, ID data store 206, ACR client component 208, and API platform 302 can include functionality as more fully described herein, for example, as described above with regard to systems 100-500.

In one aspect, subsequent to a SIM (or SIM-based) authentication, the ACR client component 208 can communicate with the ACRS component 202 via one or more elements/nodes of communication network 1(104) such as network gateway 602. As an example, the network gateway 602 can include, but is not limited to, a proxy server (e.g., a Hypertext Transfer Protocol (HTTP) proxy server), and/or a multi service proxy (MSP), and can be utilized for header enrichment in communication messages (e.g., HTTP requests) transmitted from the UE 102 to one or more network servers (not shown). In one aspect, the UE 102, for example, on power-on or on entering a coverage area of the mobility network, can perform an authentication (e.g., SIM/SIM-based authentication) with the communication network 1(104) to allow the UE 102 to access the communication network 1(104). By way of example, during and/or subsequent to the authentication, a network support node (e.g., GGSN), can assign an IP address to a MSISDN/SubId of the UE 102, and propagate the IP address and corresponding MSISDN/SubId to downstream network elements such as the network gateway 602.

The ACR client component 208 can transmit (e.g., periodically, based on a schedule/event, on demand, etc.) a request for a V-SubId for UE 102 to the network gateway 602 (an endpoint/URL served by the network gateway 602), which in turn can detect the IP address from the request, and accordingly determine the corresponding MSISDN/SubId associated with the IP address. In one aspect, the network gateway 602 can utilize the MSISDN/SubId to query the ACRS component 202 for a V-SubId. In response, the network gateway 602 can receive the V-SubId generated by the ACRS component 202 and transmit it, for example, in a header (e.g., HTTP header) or a message body, back to the ACR client component 208. As an example, the ACR client component 208 can store the V-SubId, for example, in a memory (not shown), for a predefined time period (e.g., 24 hours). In one aspect, the ACR client component 208 provides the V-SubId as a device identifier for UE 102 to application 604 and/or browser 606. It is noted that application 604 and/or browser 606 can be substantially similar to application(s) 210 described above and can include functionality as more fully described herein, for example, with regard to application(s) 210.

As an example, application 604 can include the V-SubId (as a device identifier for UE 102) in communication messages transmitted to application (app) server 608 and/or any other network element by communication through the communication network 1(104) and/or communication network 2(108). In one aspect, the application 604 via app server 608 can exchange the V-SubId for a static ACR based on user authorization. Moreover, the application 604 can request and receive user authorization (e.g., via authorization component 404) to make a request for an ACR. For example, the application 604, via an interface displayed on UE 102, can query whether the user would like the application 604 to remember preferences and/or credentials associated with the user and/or UE 102 and/or allow tracking and/or profiling of user activity associated with the application 604. If the user provides a positive acknowledgment, the app server 608 can transmit a command to the API platform 302 requesting for an ACR.

On verifying user authorization, the API platform 302 can transmit an ACRgetcreate( ) query to the ACRS component 202. As an example, the ACRgetcreate( ) query can include input parameters, such as V-SubId (e.g., provided by the application 604) and/or SubId (e.g., provided by the API platform 302) and/or an identifier associated with the application (e.g., provided to the API platform 302 by the app server 608 at on-boarding). In response, the ACRS component 202 can generate the ACR for the application 604 and transmit the ACR to the application 604. In addition, the ACRS component 202 can notify the network gateway 602 of the newly generated ACR for the application, which in turn can forward the ACR to the ACR client component 208. As an example, for subsequent communication, the application 604 can utilize the ACR as an identifier for UE 102, until the ACR is deleted (e.g., based on user authorization).

In another aspect, the browser 606 can include the V-SubId (as a device identifier for UE 102) in communication messages transmitted to entities, for example, web servers (not shown) via communication network 2(108) (and/or communication network 1(104)). In one example, if the communication messages are directed to (and/or reach) trusted entity(ies) 110, the trusted entity(ies) 110 can exchange the V-SubId for the SubId associated with UE 102. Moreover, the trusted entity(ies) 110 can transmit a SubId lookup request, with the V-SubId as an input parameter, to the API platform 302. In response, the API platform 302 can query the ACRS component 202 with the V-SubId, which in turn can perform a reverse lookup to determine the SubId corresponding to the received V-SubId. Further, the ACRS component 202 can transmit the SubId to the trusted entity(ies) 110 via the API platform 302. In another example, if the communication messages are directed to (and/or reach) untrusted entity(ies) 112, the untrusted entity(ies) 112 can exchange the V-SubId for an ACR based on user authorization. Moreover, the untrusted entity(ies) 112 can transmit a request for the ACR to the API platform 302, which in turn can verify the user authorization and transmit an ACRgetcreate( ) query to the ACRS component 202. The ACRS component 202 can create a new ACR specific to the untrusted entity(ies) 112 and deliver the ACR to the untrusted entity(ies) 112 (e.g., via the API platform 302), the network gateway 602 and/or the ACR client component 208.

Consider a non-limiting example scenario wherein a user accesses an untrusted website (via browser 606 on the user equipment 102), for example, www.shopping.com. Each time the user accesses the website, the browser 606 utilizes a new V-SubId and thus, the web server associated with the website (www.shopping.com) cannot monitor and/or track user behavior. Continuing with this example, if the user would like the website to remember the user (e.g., remember user preferences, credentials, historical data, and/or track user behavior to provide value added services), the user, via UE 102, can authorize the web server to receive a site-specific ACR, for example, by clicking or checking a "Remember me" option provided on the website. In this scenario, the web server can exchange via communication with the API platform 302 the V-SubId for a site-specific ACR that can be utilized during subsequent communication between the UE 102 and the website. Accordingly, since the ACR remains static for a fixed time period, the web server can monitor, save and/or analyze historical data associated with the user, for example, to provide the user with product recommendations, user profile information, store shipping/billing information, etc. However, since the ACR is site-specific, profiling and/or tracking of user behavior across different websites can be impeded and/or prevented.

Similarly, in another non-limiting example, the user can access an untrusted application (e.g., application 604), for example, a news application on the UE 102. The news application is provided with a different V-SubId (e.g., by the ACR client component 208) each time the user accesses the application and thus the app server 608 cannot track and/or monitor user's activity. However, if the user would like the news application to remember the user (e.g., remember user preferences, credentials, historical data, and/or track user behavior to provide value added services), the user, via UE 102, can authorize the app server 608 to be assigned an app-specific ACR, for example, by clicking or checking a "Remember me" option on an interface provided by the news application. In this scenario, the app server 608 can exchange via communication with the API platform 302 the V-SubId for the app-specific ACR that can be utilized during subsequent communication between the UE 102 and the app server 608. Accordingly, the app server 608 can monitor and/or track user activity (e.g., news articles the user has read or commented on) for example, to identify user interests and prioritize news articles displayed to the user.

Further, in still another non-limiting example scenario, the user can access an untrusted application (e.g., application 604), for example a music application, on the UE 102 that is not associated with a dedicated app server. In this example scenario, the music application can receive a different V-SubId from the ACR client component 208 each time the user accesses the application. In one aspect, if the user would like the music application to remember the user (e.g., remember user preferences, credentials, historical data, and/or track user behavior to provide value added services), the user, via UE 102, can authorize the music app to be assigned an app-specific ACR (e.g., by the ACRS component 202), for example, by clicking or checking a "Remember me" option on an interface provided by the news application. The ACRS client component 208 can receive (e.g., from the ACRS component 202) the ACR assigned to the music app and provide the ACR to the music app for a subsequent request(s) from the music application for a V-SubId. Alternatively, the music app can receive V-SubId from the ACRS client component 208 and then dynamically query the API platform 302 to perform a V-SubId to ACR lookup. Since the music app has been authorized by the user to be assigned an ACR, the API platform 302 can return the ACR specific to the music app, for example, in a HTTP response to the request and/or in a out-of-band push method over SMS to further increase security.

Consider yet another non-limiting example scenario, wherein the user accesses the trusted entity(ies)110 via the untrusted entity(ies) 112 and/or app server 608, as depicted in FIG. 6 via dotted lines. For example, the user can access an untrusted application 402, for example, a weather application, and/or a weather website (www.weather.com) through the browser 606. An app server 608 and/or web server (e.g., untrusted entity(ies)112) associated with the weather application and/or website (www.weather.com) can be provided with a V-SubId, during communication with the UE 102 to impede and/or prevent monitoring and/or tracking of user activity. In one aspect, the app server 608 and/or web server can further communicate with a trusted entity(ies) 110, such as an advertisement (ad) server within a service provider's network. In this example, the ad server can communicate with the API platform 302 to exchange the V-SubId for a SubId associated with the user. As an example, the ad server can utilize the SubId data to identify user preferences and/or interests and select one or more ads based on the user preferences and/or interests. Further, the ad server can provide the one or more ads to the app server 608 and/or web server.

Figure 7:
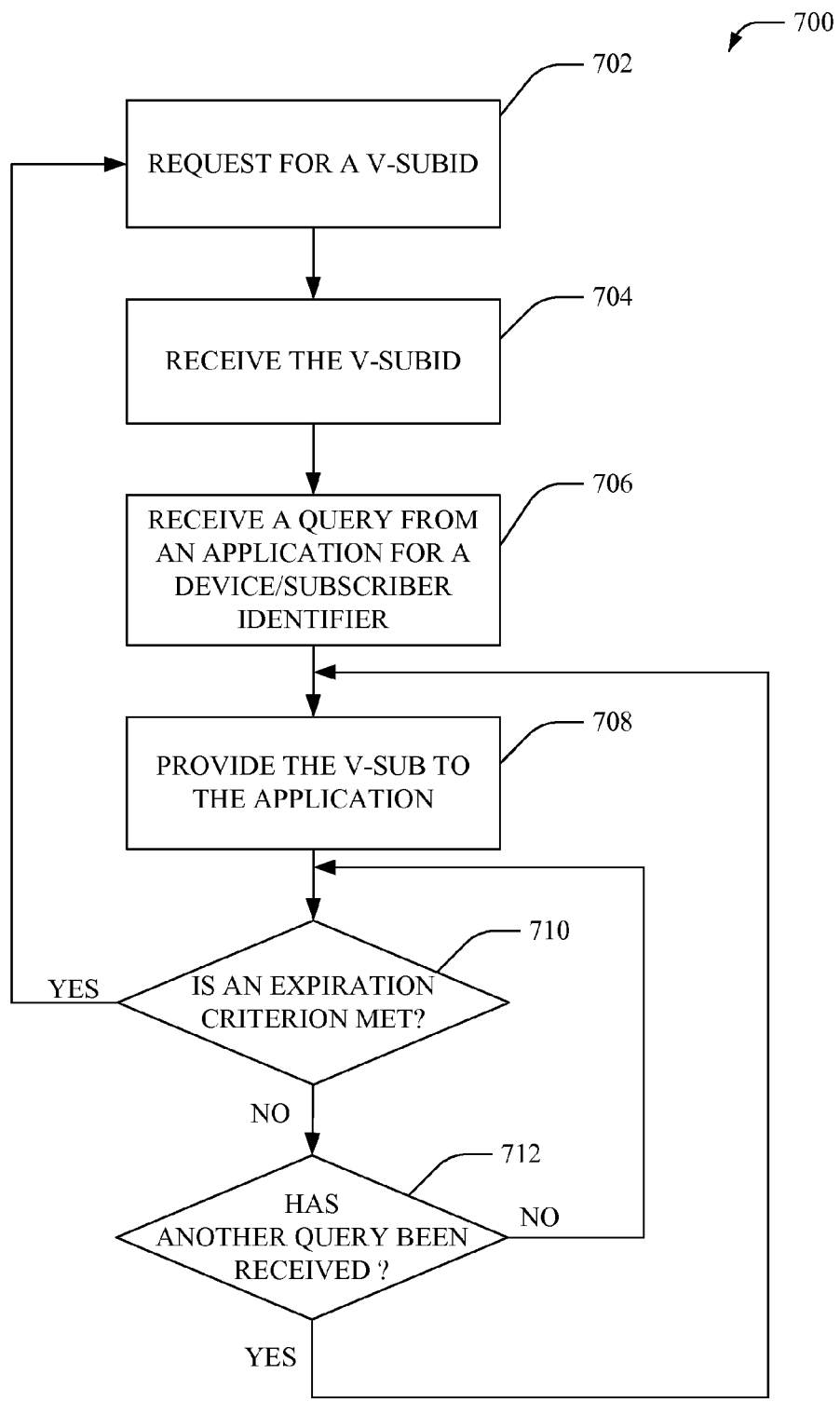
FIG. 7 illustrates an example method that facilitates receipt and utilization of V-SubIds.
Figure 8:
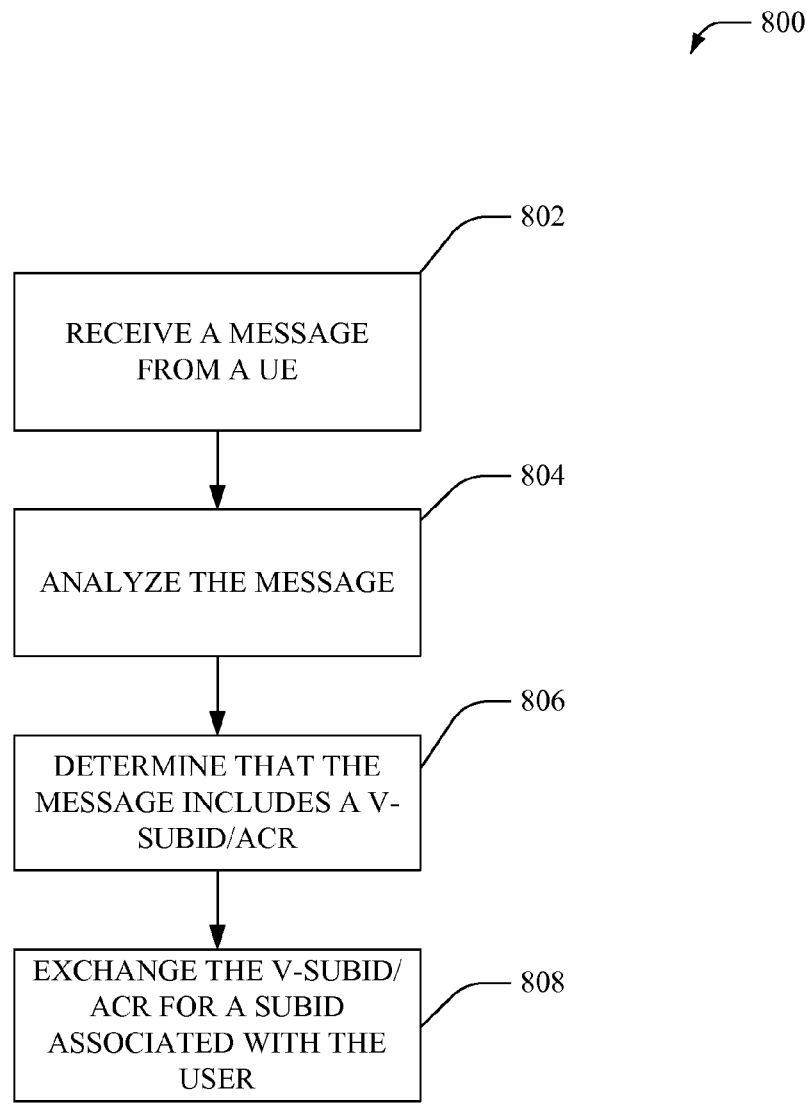
FIG. 8 illustrates an example method that enables trusted entities to determine a SubId associated with a user equipment (UE).
Figure 9:
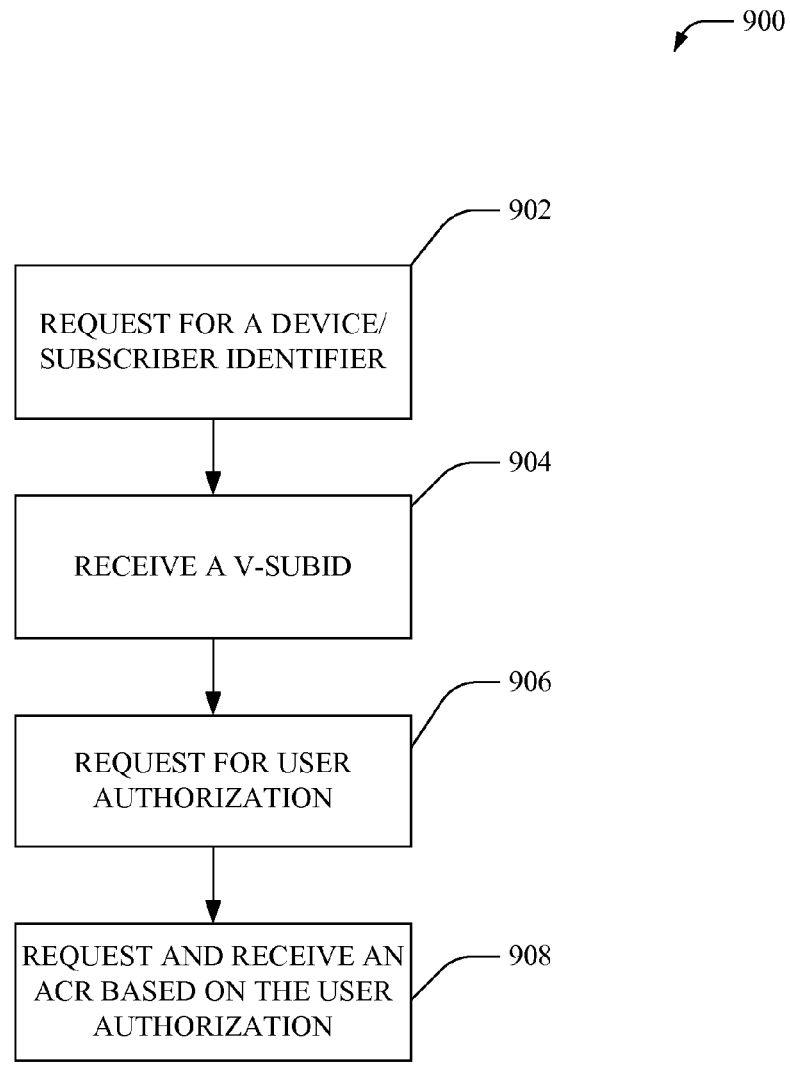
FIG. 9 illustrates an example method that facilitates ACR management in accordance with an aspect of the disclosed subject matter.

FIGS. 7-9 illustrate flow diagrams and/or methods in accordance with the disclosed subject matter. For simplicity of explanation, the flow diagrams and/or methods are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7, illustrated is an example method 700 that facilitates receipt and utilization of V-SubIds, according to an aspect of the subject disclosure. Typically, method 700 can be implemented by a UE (e.g., UE 102) to deter, impede and/or prevent tracking of subscriber activity by unauthorized entities. At 702, a request (e.g., communication message and/or data packet) can be transmitted (e.g., by the ACR client component 208), for example, to a component (e.g., the ACRS component 202) within a telecommunication network. In one aspect, the UE can perform an authentication (e.g., SIM or SIM-based) to connect with the telecommunication network, prior to the transmission of the request. At 704, the V-SubId can be received (e.g., by the ACR client component 208). A V-SubId can be generated based on, or independent of, the SubId, MSISDN, UDID, etc. associated with the UE. As an example, the V-SubId can be randomly generated, unique, opaque, and/or can be repeated and/or reused (for different UEs). In one aspect, the V-SubId can be retained within a memory of UE until an expiration criterion is met. At 706, a query is received (e.g., by the ACR client component 208) from an application, for example, installed on and/or accessed by the UE, for a device/subscriber identifier. At 708, the V-SubId is provided to the application (e.g., by the ACR client component 208). As an example, the application can utilize the V-SubId as an identifier for the UE or the subscriber of the UE (e.g., in place of the UDID).

At 710, it can be determined (e.g., by the ACR client component 208) whether an expiration criterion is met. By way of example, the expiration criterion can include (but is not limited to) a predefined time period, a predefined number of data sessions, or a predefined number of queries received from one or more applications. In one aspect, the expiration criterion can be defined by the service provider, user, UE manufacturer, etc. If the expiration criterion has been met (e.g., the predefined time period has elapsed, the predefined number of data sessions have been performed, and/or the predefined number of queries have been received, a timer has expired, etc.), the method 700 returns to 702 and a new V-SubId can be requested. Alternatively, if the expiration criterion has not been met, at 712, it can be determined (e.g., by the ACR client component 208) whether another query for a device/subscriber identifier has been received, for example, from the application (or another application). If another query has not been received the method 700 returns to 710, else if another query has been received the method 700 returns to 708.

FIG. 8 illustrates an example method 800 that enables trusted entities to determine a SubId associated with a UE, in one aspect of the subject disclosure. A trusted entity can include, but is not limited to, a trusted website, system, network, platform, server, etc., which can be authorized (e.g., by the user and/or service provider) to receive and/or utilize a SubId associated with the subscriber, for example, for providing value added services. In one aspect, the UE can access the trusted entity via one or more untrusted entities (e.g., untrusted applications and/or websites). For example, a trusted website can be accessed by the UE from a link on an untrusted website. At 802, a message from the UE can be received by the trusted entity. At 804, the message can be analyzed (e.g., by the trusted entity(ies) 110). For example, the header and/or body of the message can be evaluated to identify a sequence and/or code associated with a V-SubId/ACR. At 806, it can be determined (e.g., by trusted entity(ies) 110) that the message includes a V-SubId/ACR, for example, based on the analysis. Further, at 808, the V-SubId/ACR can be exchanged (e.g., by trusted entity(ies) 110) for a SubId associated with the user of UE. For example, the trusted entity can communicate with the ACRS component 202 via API platform 302 to obtain a SubId corresponding to the V-SubId/ACR. The SubId can be utilized by the trusted entity to enable consistent data services and/or a seamless service experience across data sessions for the UE.

FIG. 9 illustrates an example method 900 that facilitates ACR management in accordance with an aspect of the disclosed subject matter. Typically, method 900 can facilitate an exchange of a V-SubId for an application-specific ACR based on a user authorization. As an example, the ACR is static (non-changing) for a specific time period and can be utilized by an application instead of a UDID associated with a UE. At 902, a device/subscriber identifier associated with a UE can be requested (e.g., by untrusted application 402). At 904, a V-SubId can be received (e.g., by untrusted application 402). At 906, user authorization can be requested (e.g., by authorization component 404). In one aspect, the user can be prompted via a graphical and/or audible prompt on the UE, to provide authorization for the application to receive an ACR. As an example, an expiration criterion associated with the ACR can also be provided by the user. Based on the user authorization, at 908, the ACR can be requested and received (e.g., by the untrusted application 402). As an example, the ACR can be utilized in place of a UDID to provide consistent data services and/or a seamless service experience across data sessions. In one aspect, the ACR can be utilized by the untrusted application until the ACR expires and/or is deleted based on user authorization.

Figure 10:
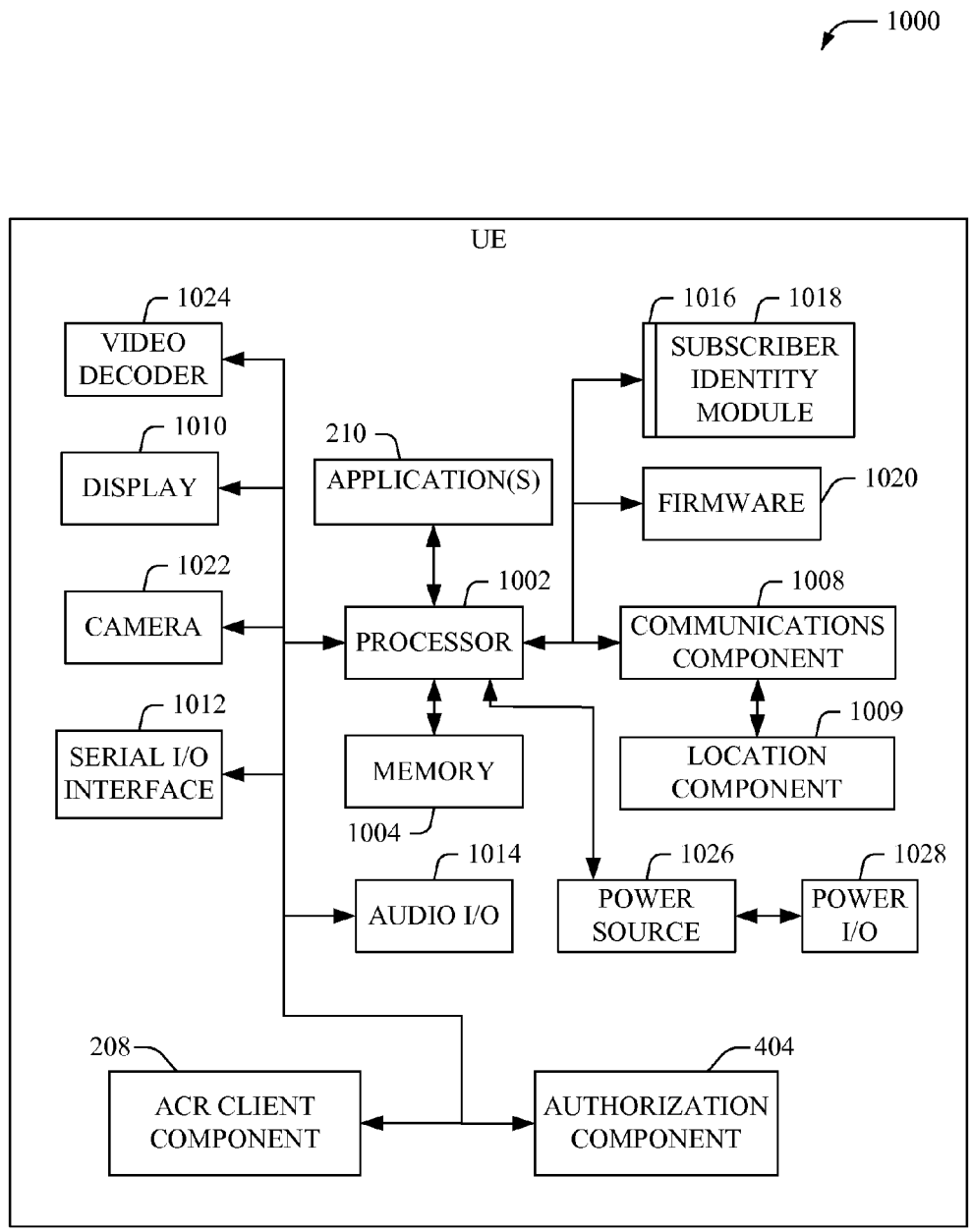
FIG. 10 illustrates an example block diagram of a user equipment suitable for preventing or impeding unauthorized tracking subscriber activity based on utilization of V-SubIds/ACRs.

Referring now to FIG. 10, there is illustrated a block diagram of a UE 1000 that prevents or impedes unauthorized tracking subscriber activity based on utilization of V-SubIds/ACRs in accordance with the subject specification. In addition, the UE 1000 can be substantially similar to and include functionality associated with UE 102 described herein. In one aspect, the UE 1000 can include a processor 1002 for controlling all onboard operations and processes. A memory 1004 can interface to the processor 1002 for storage of data (e.g., including V-SubIds/ACRs) and one or more applications 210 being executed by the processor 1002. A communications component 1008 can interface to the processor 1002 to facilitate wired/wireless communication with external systems (e.g., communication network 1(104) and/or communication network 2 (108)). The communications component 1008 interfaces to a location component 1009 (e.g., GPS transceiver) that can facilitate location detection of the UE 1000.

The UE 1000 can include a display 1010 for displaying content downloaded and/or for displaying text information related to operating and using the device features. A serial I/O interface 1012 is provided in communication with the processor 1002 to facilitate serial communication (e.g., USB, and/or IEEE 1394) via a hardwire connection. Audio capabilities are provided with an audio I/O component 1014, which can include a speaker for the output of audio signals related to, for example, recorded data or telephony voice data, and a microphone for inputting voice signals for recording and/or telephone conversations.

Further, the UE 1000 can include a slot interface 1016 for accommodating a subscriber identity module (SIM) 1018. As an example, data from the SIM 1018 can be utilized to facilitate authentication with communication network 1(104), based on which a V-SubId/ACR can be received by the UE 1000. Firmware 1020 is also provided to store and provide to the processor 1002 startup and operational data. The UE 1000 can also include an image capture component 1022 such as a camera and/or a video decoder 1024 for decoding encoded multimedia content. Further, the UE 1000 can include a power source 1026 in the form of batteries, which power source 1026 interfaces to an external power system or charging equipment via a power I/O component 1028. In addition, the UE 1000 can include an ACR client component 208, application(s) 210, and authorization component 404, which can be stored in memory 1004 and can include respective functionality, as more fully described herein, for example, with regard to systems 100-600.

Figure 11:
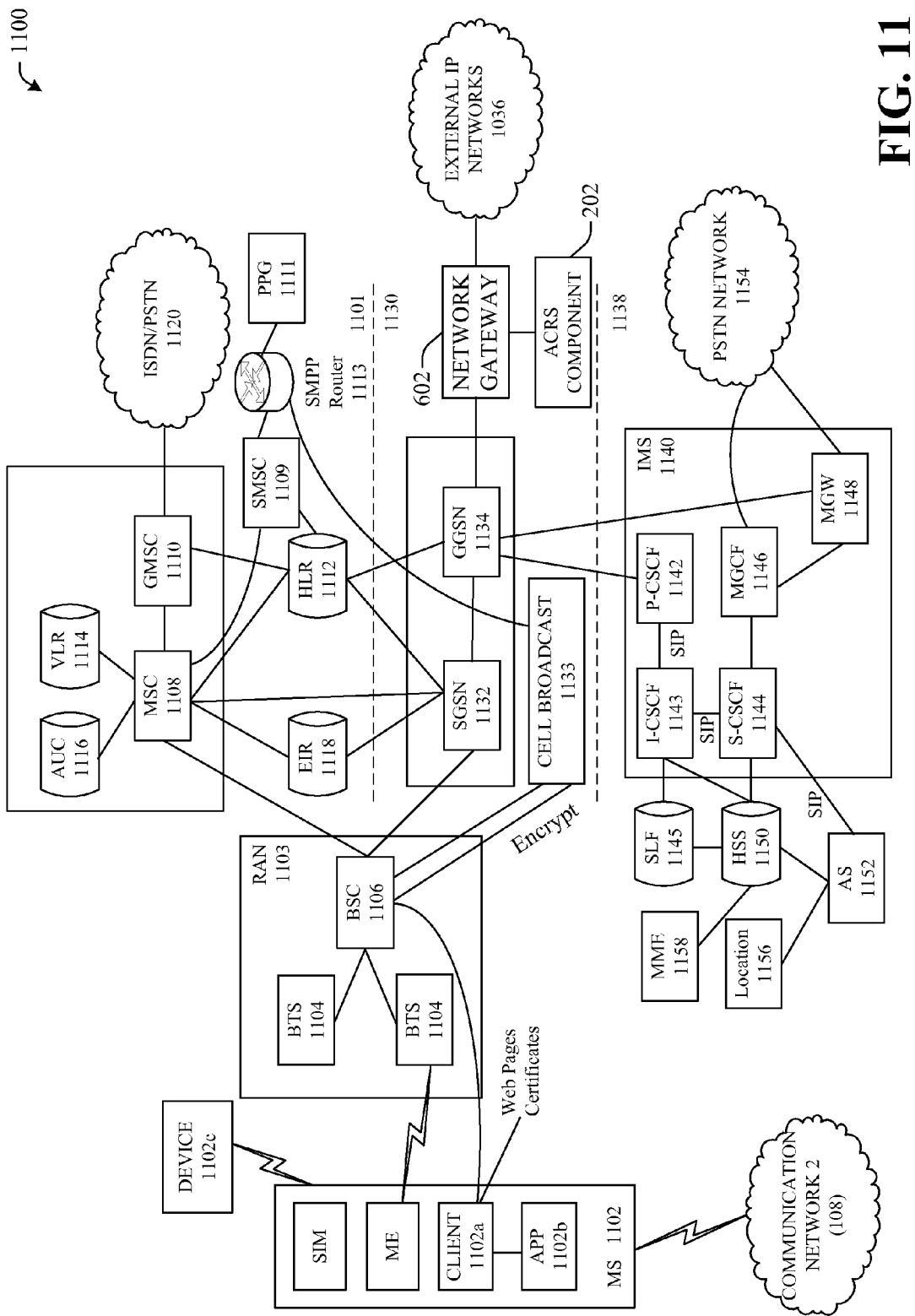
FIG. 11 illustrates a Global System for Mobile Communications (GSM)/General Packet Radio Service (GPRS)/Internet protocol (IP) multimedia network architecture that can employ the disclosed architecture.

Now turning to FIG. 11, there is depicted an example GSM/GPRS/IP multimedia network architecture 1100 that can employ the disclosed communication architecture. In particular, the GSM/GPRS/IP multimedia network architecture 1100 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile phone or a laptop computer that is used by mobile subscribers, with a Subscriber identity Module (SIM). The SIM includes an International Mobile Subscriber Identity (IMSI) and/or MSISDN, which is a unique identifier of a subscriber. The MS 1102 includes an embedded client 1102a that receives and processes messages received by the MS 1102. The embedded client 1102a can be implemented in JAVA and is discussed more fully below. It is noted that MS 1102 can be substantially similar to UE 102 and UE 1002, and can include functionality described with respect to UEs 102, 1002 in systems 100-600 and 1000.

The embedded client 1102a communicates with an application 1102b that provides services and/or information to an end user. In one aspect, embedded client 1102a includes the ACR client component 208 described in detail with respect to systems 200-600 and 1000. Further, the application 1102b can include application(s) 210 described in detail with respect to systems 200, 300, and 500. Additionally or alternately, the MS 1102 and a device 1102c can be enabled to communicate via a short-range wireless communication link, such as BLUETOOTH®. Further, MS 1102 can also communicate with communication network 2(108) (e.g., a WiFi network). As one of ordinary skill in the art would recognize, there can be an unlimited number of devices 1102c that use the SIM within the MS 1102 to provide services, information, data, audio, video, etc. to end users.

The BTS 1104 is physical equipment, such as a radio tower, that enables a radio interface to communicate with the MS 1102. Each BTS can serve more than one MS. The BSC 1106 manages radio resources, including the BTS. The BSC 1106 can be connected to several BTSs. The BSC and BTS components, in combination, are generally referred to as a base station (BSS) or radio access network (RAN) 1103.

The GSM core network 1101 also includes a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1118. The MSC 1108 performs a switching function for the network. The MSC also performs other functions, such as registration, authentication, location updating, handovers, and call routing. The GMSC 1110 provides a gateway between the GSM network and other networks, such as an Integrated Services Digital Network (ISDN) or Public Switched Telephone Networks (PSTNs) 1120. In other words, the GMSC 1110 provides interworking functionality with external networks.

The HLR 1112 is a database or component(s) that comprises administrative information regarding each subscriber registered in a corresponding GSM network. The HLR 1112 also includes the current location of each MS. The VLR 1114 is a database or component(s) that contains selected administrative information from the HLR 1112. The VLR contains information necessary for call control and provision of subscribed services for each MS currently located in a geographical area controlled by the VLR. The HLR 1112 and the VLR 1114, together with the MSC 1108, provide the call routing and roaming capabilities of GSM. The AuC 1116 provides the parameters needed for authentication and encryption functions. Such parameters allow verification of a subscriber's identity. The EIR 1118 stores security-sensitive information about the mobile equipment. In one aspect, the AuC 1116 performs a SIM authentication, in response to MS 1102, for example, powering-on and/or entering a coverage area of the BTS 1104. The SIM authentication allows the MS 1102 to communicate via the GSM/GPRS/IP multimedia network. By way of example, on authentication, a Gateway GPRS Support Node (GGSN) 1134, can assign an Internet protocol (IP) address to the MS 1102, receive a device number, such as, but not limited to, a MSISDN associated with the MS 1102 from the HLR 1112, and propagate the IP address and corresponding MSISDN to downstream network elements such as the network gateway 602. The network gateway 602 can include functionality as more fully described herein, for example, as described above with regard to systems 600.

A Short Message Service Center (SMSC) 1109 allows one-to-one Short Message Service (SMS) messages to be sent to/from the MS 1102. A Push Proxy Gateway (PPG) 1111 is used to "push" (e.g., send without a synchronous request) content to the MS 1102. The PPG 1111 acts as a proxy between wired and wireless networks to facilitate pushing of data to the MS 1102. A Short Message Peer to Peer (SMPP) protocol router 1113 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS 1102 first registers with the network to indicate its current location by performing a location update and IMSI attach procedure. The MS 1102 sends a location update including its current location information to the MSC/VLR, via the BTS 1104 and the BSC 1106. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1130 is logically implemented on the GSM core network architecture by introducing two packet-switching network nodes, a serving GPRS support node (SGSN) 1132, a cell broadcast and a Gateway GPRS support node (GGSN) 1134. The SGSN 1132 is at the same hierarchical level as the MSC 1108 in the GSM network. The SGSN controls the connection between the GPRS network and the MS 1102. The SGSN also keeps track of individual MS's locations, security functions, and access controls.

A Cell Broadcast Center (CBC) 1133 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1134 provides a gateway between the GPRS network and a public packet network (PDN) or other IP networks 1136. That is, the GGSN provides interworking functionality with external networks, and sets up a logical link to the MS 1102 through the SGSN 1132. In one aspect, the GGSN 1134 is coupled to the other IP networks 1136 via the network gateway 602. Moreover, network gateway 602 can be coupled to the ACRS component 202, which can include functionality as more fully described herein, for example, as described above with regard to systems 200-600. Although it is depicted in FIG. 11 as residing outside the GGSN 1134, the network gateway 602 and/or ACRS component 202 can reside within (e.g., completely or partially) the GGSN 1134. When packet-switched data leaves the GPRS network, it is transferred to an external TCP-IP network 1136, such as an X.25 network or the Internet. In order to access GPRS services, the MS 1102 first attaches itself to the GPRS network by performing an attach procedure. The MS 1102 then activates a packet data protocol (PDP) context, thus activating a packet communication session between the MS 1102, the SGSN 1132, and the GGSN 1134. In a GSM/GPRS network, GPRS services and GSM services can be used in parallel. A GPRS network 1130 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network.

The IP multimedia network 1138 was introduced with 3GPP Release 5, and includes an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 can be common to the GSM network 1101, the GPRS network 1130 as well as the IP multimedia network 1138.

The IP multimedia system 1140 is built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 forwards session initiation protocol (SIP) messages received from the MS to an SIP server in a home network (and vice versa) of the MS. The P-CSCF 1142 can also modify an outgoing request according to a set of rules defined by the network operator (for example, address analysis and potential modification).

The I-CSCF 1143 forms an entrance to a home network and hides the inner topology of the home network from other networks and provides flexibility for selecting an S-CSCF. The I-CSCF 1143 can contact a subscriber location function (SLF) 1145 to determine which HSS 1150 to use for the particular subscriber, if multiple HSSs 1150 are present. The S-CSCF 1144 performs the session control services for the MS 1102. This includes routing originating sessions to external networks and routing terminating sessions to visited networks. The S-CSCF 1144 also decides whether an application server (AS) 1152 is required to receive information on an incoming SIP session request to ensure appropriate service handling. This decision is based on information received from the HSS 1150 (or other sources, such as an application server 1152). The AS 1152 also communicates to a location server 1156 (e.g., a Gateway Mobile Location Center (GMLC)) that provides a position (e.g., latitude/longitude coordinates) of the MS 1102. The MME 1158 provides authentication of a user by interacting with the HSS 1150 in LTE networks.

The HSS 1150 contains a subscriber profile and keeps track of which core network node is currently handling the subscriber. It also supports subscriber authentication and authorization functions (AAA). In networks with more than one HSS 1150, a subscriber location function provides information on the HSS 1150 that contains the profile of a given subscriber.

The MGCF 1146 provides interworking functionality between SIP session control signaling from the IMS 1140 and ISUP/BICC call control signaling from the external GSTN networks (not shown). It also controls the media gateway (MGW) 1148 that provides user-plane interworking functionality (e.g., converting between AMR- and PCM-coded voice). The MGW 1148 also communicates with a PSTN network 1154 for TDM trunks. In addition, the MGCF 1146 communicates with the PSTN network 1154 for SS7 links. According to an embodiment, systems 100-600 disclosed herein can be implemented within and/or communicatively coupled to the GSM network 1101, the GPRS network 1130, the IP multimedia network 1138, and/or the IP networks 1136.

Figure 12:
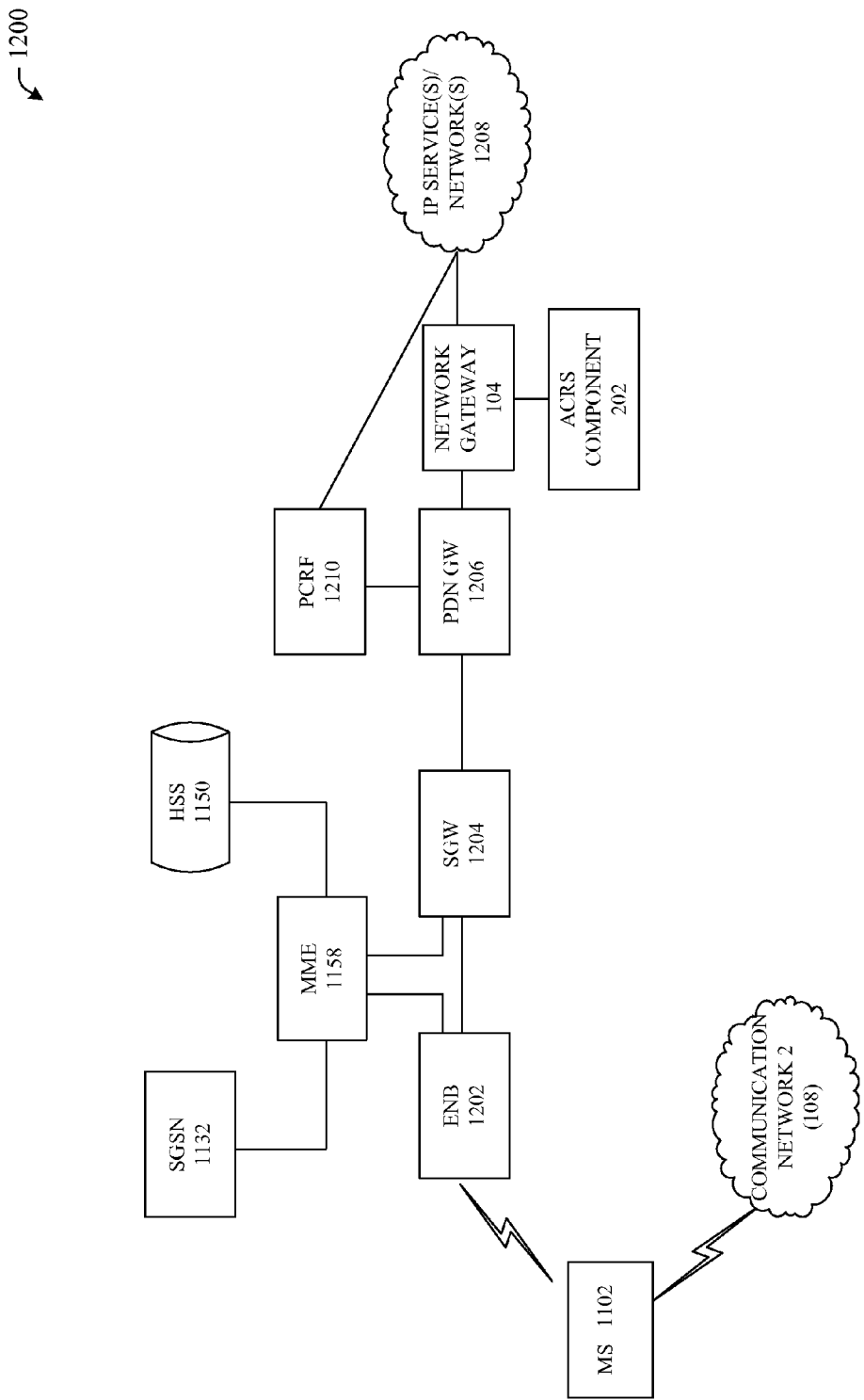
FIG. 12 illustrates a Long Term Evolution (LTE) network architecture that can employ the disclosed architecture.

FIG. 12 illustrates a high-level block diagram that depicts an example LTE network architecture 1200 that can employ the disclosed communication architecture. MS 1102, SGSN 1132, HSS 1150, MME 1158, communication network 2(108), ACRS component 202, and network gateway 602 can include functionality as more fully described herein, for example, as described above with regard to systems 100-600 and 1100.

The evolved RAN for LTE consists of an eNodeB (eNB) 1202 that can facilitate connection of MS 1102 to an evolved packet core (EPC) network. The connection of the MS 1102 to the evolved packet core (EPC) network is subsequent to an authentication, for example, a SIM-based authentication between the MS 1102 and the evolved packet core (EPC) network. As an example, the eNB 1202 can host a PHYsical (PHY), Medium Access Control (MAC), Radio Link Control (RLC), and Packet Data Control Protocol (PDCP) layers that include the functionality of user-plane header-compression and encryption. In addition, the eNB 1202 can implement at least in part Radio Resource Control (RRC) functionality (e.g., radio resource management, admission control, scheduling, cell information broadcast, etc.). The eNB 1202 can be coupled to a serving gateway (SGW) 1204 that facilitates routing of user data packets and serves as a local mobility anchor for data bearers when the MS 1102 moves between eNBs. In addition, the SGW 1204 can act as an anchor for mobility between LTE and other 3GPP technologies (GPRS, UMTS, etc.). When MS 1102 is in an idle state, the SGW 1204 terminates a downlink (DL) data path and triggers paging when DL data arrives for the MS 1102. Further, the SGW 1204 can perform various administrative functions in the visited network such as collecting information for charging and lawful interception.

In one aspect, the SGW 1204 can be coupled to a Packet Data Network Gateway (PDN GW) 1206 that provides connectivity between the MS 1102 and external packet data networks such as IP service(s)/network(s) 1208. Moreover, the PDN GW 1206 is a point of exit and entry of traffic for the MS 1102. It is noted that the MS 1102 can have simultaneous connectivity with more than one PDN GW (not shown) for accessing multiple PDNs.

The PDN GW 1206 performs IP address allocation for the MS 1102, as well as QoS enforcement and implements flow-based charging according to rules from a Policy Control and Charging Rules Function (PCRF) 1210. The PCRF 1210 can facilitate policy control decision-making and control flow-based charging functionalities in a Policy Control Enforcement Function (PCEF), which resides in the PDN GW 1206. The PCRF 1210 can store data (e.g., QoS class identifier and/or bit rates) that facilitates QoS authorization of data flows within the PCEF.

In one aspect, the PDN GW 1206 can facilitate filtering of downlink user IP packets into the different QoS-based bearers and perform policy enforcement, packet filtering for each user, charging support, lawful interception and packet screening. Further, the PDN GW acts as the anchor for mobility between 3GPP and non-3GPP technologies such as WiMAX and 3GPP2 (CDMA 1× and EvDO).

In one aspect, the PDN GW 1206 is coupled to the IP service(s)/network(s) 1208 via the network gateway 602. The network gateway 602 can be coupled to the ACRS component 202, which can include functionality as more fully described herein, for example, as described above with regard to systems 200-600. Although it is depicted in FIG. 12 as residing outside the PDN GW 1206, the network gateway 602 and/or ACRS component 202 can reside within (e.g., completely or partially) the PDN GW 1206. Although the GSM/GPRS/IP multimedia network architecture 1100 and LTE network architecture 1200 is described and illustrated herein, it is noted that most any communication network architecture can be utilized to implement the disclosed embodiments.

Figure 13:
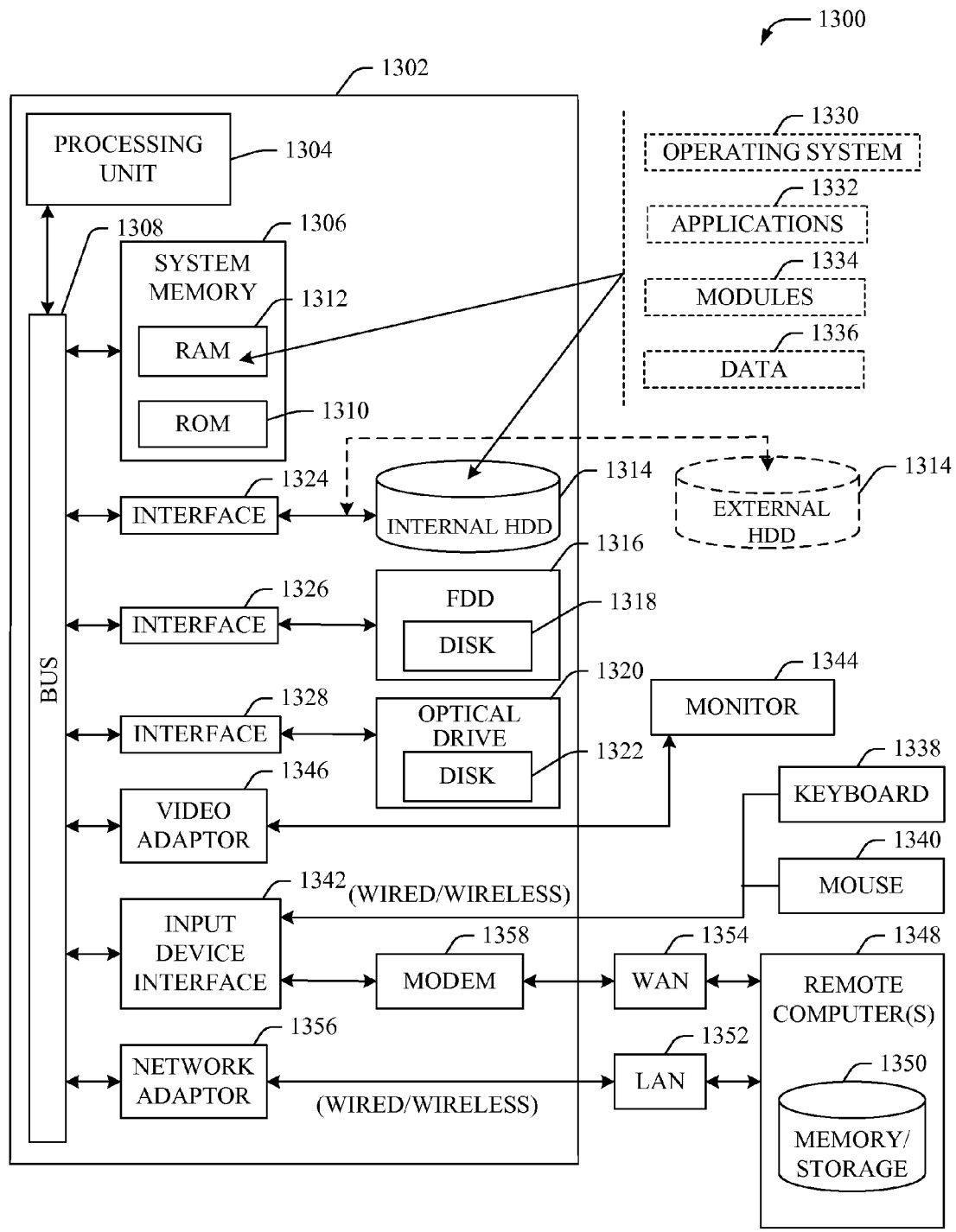
FIG. 13 illustrates a block diagram of a computer operable to execute the disclosed communication architecture.

Referring now to FIG. 13, there is illustrated a block diagram of a computer 1302 operable to execute the disclosed communication architecture. In order to provide additional context for various aspects of the disclosed subject matter, FIG. 13 and the following discussion are intended to provide a brief, general description of a suitable computing environment 1300 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various aspects of the specification includes a computer 1302, the computer 1302 including a processing unit 1304, a system memory 1306 and a system bus 1308. As an example, the gateway(s), entity(ies), component(s), server(s), and platform(s) (e.g., network gateway 602, trusted entity(ies) 110, untrusted entity(ies) 112, ACRS component 202, ACR client component 208, API platform 302, UE 102, authentication server 406, app server 608, etc.) disclosed herein with respect to system 100-600 can each include at least a portion of the computer 1302. In another example, a combination of the gateway(s), entity(ies), component(s), server(s), and/or platform(s) can each include one or more computers such as, or substantially similar to, computer 1302. Further, each of the network element(s) (stand alone and/or in combination with one or more other network elements) disclosed herein with respect to systems 1100 and 1200 can include at least a portion of computer 1302, or can include one or more computers such as, or substantially similar to, computer 1302. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314, which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the specification can be implemented with various commercially available operating systems or combinations of operating systems.

A user can enter commands and information into the computer 1302 through one or more wired/wireless input devices, e.g., a keyboard 1338 and/or a pointing device, such as a mouse 1340 or a touchscreen or touchpad (not illustrated, but which may be integrated into UE 102 in some embodiments). These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc. A monitor 1344 or other type of display device is also connected to the system bus 1308 via an interface, such as a video adapter 1346.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 is connected to the local network 1352 through a wired and/or wireless communication network interface or adapter 1356. The adapter 1356 can facilitate wired or wireless communication to the LAN 1352, which can also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are example and other means of establishing a communications link between the computers can be used.

The computer 1302 is operable to communicate with any wireless devices or entities operatively disposed in wireless communication, e.g., desktop and/or portable computer, server, communications satellite, etc. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A user equipment, comprising:
    a memory that stores executable instructions; and
    a processor, coupled to the memory, that facilitates execution of the executable instructions to perform operations, comprising:
    facilitating an authentication that allows a user equipment to communicate via a first network device of a first communication network, wherein the authentication is based on static identifier data indicative of a static identifier associated with a subscriber account related to the user equipment and wherein the first communication network is a telecommunication network;
    in response to the authentication being determined to be successful, receiving, via the first network device, variable identifier data indicative of a variable subscriber identifier that has been assigned to the static identifier, wherein the variable identifier data is updated in response to determining that an expiration criterion has been satisfied comprising determining that defined number of data sessions performed by a set of applications of the user equipment have been terminated; and
    directing, to second network device of a second communication network, the variable identifier data as an identifier of the user equipment during a communication associated with an application of the user equipment that takes place via the second network device.

2. The user equipment of claim 1, wherein the variable identifier data is updated in response to a defined period of time being determined to be exceeded.

3. The user equipment of claim 2, wherein the variable identifier data is updated by employing a random number generator device.

4. The user equipment of claim 1, wherein the operations further comprise:
    inserting the variable identifier data within a communication message that is to be transmitted from the user equipment to the second network device.

5. The user equipment of claim 4, wherein the inserting comprises inserting the variable identifier data within a header of the communication message.

6. The user equipment of claim 1, wherein the operations further comprise:
    requesting the first network device for anonymous customer reference data indicative of an anonymous customer reference that is specific to the application, wherein the anonymous customer reference is static for a defined time period.

7. The user equipment of claim 6, wherein the operations further comprise:

receiving from the first network device, the anonymous customer reference specific to the application.

8. The user equipment of claim 7, wherein the operations further comprise:
in response to receiving, from the application, request data indicative of a request for a device identifier associated with the user equipment, providing, to the application, the anonymous customer reference data, wherein the providing comprises providing the anonymous customer reference data in response to determining that the anonymous customer reference data is valid.

9. The user equipment of claim 7, wherein the operations further comprise:
receiving input data that authorizes deletion of the anonymous customer reference data; and
directing, to the first network device, the input data to facilitate the deletion of the anonymous customer reference.

10. The user equipment of claim 1, wherein the static identifier data is associated with a subscriber identity module of the user equipment.

11. The user equipment of claim 1, wherein the variable identifier data is updated in response to a defined number of queries being received from the application.

12. A method, comprising:
directing, by a user equipment comprising a processor, request data to a network gateway device of a telecommunications network, wherein the request data represents a request for a variable subscriber identifier that is to be utilized as a device identifier for the user equipment;
receiving, by the user equipment, variable identifier data indicative of the variable subscriber identifier that is generated by the network gateway in response to an authentication of the user equipment with the telecommunications network by employing a static identifier associated with a subscriber account related to the user equipment; and
utilizing, by the user equipment, the variable identifier data as the device identifier of the user equipment during a transmission of a communication message, wherein the variable identifier data is modified in response to determining that an expiration criterion has been satisfied comprising determining that defined number of data sessions performed by a set of applications of the user equipment have ended.

13. The method of claim 12, further comprising:
directing, by the user equipment, information associated with a subscriber identity module of the user equipment to a network device of the telecommunication network, wherein the directing the information facilitates the authentication.

14. The method of claim 12, wherein the utilizing includes inserting the variable identifier data within a header of the communication message.

15. The method of claim 12, wherein the request data is first request data, the variable identifier data is first variable identifier data and the method further comprises:
determining, by the user equipment, that the expiration criterion has been satisfied;
in response to the determining that the expiration criterion has been satisfied, receiving, by the user equipment, second variable identifier data from the network gateway device, wherein the second variable identifier data comprises a modified version of variable subscriber identifier.

16. The method of claim 12, wherein the telecommunications network is a first communication network and the utilizing includes utilizing the variable subscriber identifier as the device identifier of the user equipment during the transmission of the communication message via network device of a second communication network.

17. The method of claim 12, wherein the request data is first request data, the request is a first request, the communication message is a first communication message, and the method further comprises:
in response to receiving user authorization data, directing, by the user equipment, second request data to the network gateway, wherein the second request data represents a second request for an anonymous customer reference that is specific to an application executed via the user equipment and does not change for a fixed time period; and
subsequent to receiving anonymous customer reference data indicative of the anonymous customer reference, inserting, by the user equipment, the anonymous customer reference in a second communication message that is associated with the application.

18. The method of claim 17, wherein the user authorization data is a first user authorization data and the method further comprises:
in response to receiving second user authorization data, deleting, by the user equipment, the anonymous customer reference data.

19. A non-transitory computer-readable storage device comprising executable instructions that, in response to execution, cause a user equipment comprising a processor to perform operations, comprising:
directing, to a first network device of a first communication network, static identifier data indicative of a subscriber account related to the user equipment to facilitate an authentication of a user equipment in connection with determining whether to allow the user equipment to connect with the first network device, wherein the first communication network is a telecommunication network;
in response to the authentication being determined to be successful, receiving, via the first network device, first variable identifier data indicative of a first variable subscriber identifier that has been assigned to the static identifier data, wherein the first variable identifier data is utilized as a device identifier of the user equipment during a first communication via a second network device of a second communication network; and
in response to determining that an expiration criterion has been satisfied comprising determining that defined number of data sessions performed by a set of applications of the user equipment have been terminated, receiving, via the first network device, second variable identifier data indicative of a second variable subscriber identifier that has been assigned to the static identifier data, wherein the second variable identifier data is utilized as the device identifier of the user equipment during a second communication via the second network device.

20. The non-transitory computer-readable storage device of claim 19, wherein the first variable identifier data comprises a random number assigned to the user equipment.

* * * * *